(12) United States Patent  
Miller et al.

(10) Patent No.: US 11,709,494 B2  
(45) Date of Patent: Jul. 25, 2023

(54) MULTIPLE MOTOR CONTROL SYSTEM FOR NAVIGATING A MARINE VESSEL

(71) Applicant: Garmin Switzerland GmbH, Schaffhausen (CH)

(72) Inventors: Albert F. Miller, Gardner, KS (US); Robert M. Kalis, Overland Park, KS (US); John B. Whiteside, Lenexa, KS (US); Jarrod W. Seymour, Overland Park, KS (US); Eric W. Heling, Overland Park, KS (US)

(73) Assignee: Garmin Switzerland GmbH

( * ) Notice: Subject to any disclaimer, the term of this patent is extended or adjusted under 35 U.S.C. 154(b) by 143 days.

(21) Appl. No.: 17/317,454

(22) Filed: May 11, 2021

(65) Prior Publication Data

US 2021/0263516 A1 Aug. 26, 2021

Related U.S. Application Data

(63) Continuation of application No. 16/946,701, filed on Jul. 1, 2020, now Pat. No. 11,009,880, which is a continuation of application No. 15/897,922, filed on Feb. 15, 2018, now Pat. No. 10,739,771.

(60) Provisional application No. 62/596,994, filed on Dec. 11, 2017.

(51) Int. Cl.
| | |
|---|---|
| *G05D 1/00* | (2006.01) |
| *G05D 1/02* | (2020.01) |
| *B63H 20/12* | (2006.01) |
| *B63H 20/00* | (2006.01) |
| *B63H 20/14* | (2006.01) |

(Continued)

(52) U.S. Cl.  
CPC ......... *G05D 1/0206* (2013.01); *B63H 20/007* (2013.01); *B63H 20/12* (2013.01); *B63H 20/14* (2013.01); *B63H 25/42* (2013.01); *B63H 2020/003* (2013.01); *B63H 2025/465* (2013.01)

(58) Field of Classification Search  
USPC .................................................. 701/21, 200  
See application file for complete search history.

(56) References Cited

U.S. PATENT DOCUMENTS

| | | | |
|---|---|---|---|
| 3,807,345 A | | 4/1974 | Peterson |
| 5,362,263 A | * | 11/1994 | Petty .................... G05D 1/0206 440/1 |
| 5,618,212 A | | 4/1997 | Moore |

(Continued)

OTHER PUBLICATIONS

Printout from https://www.cabelas.com/product/MINN-KOTA-ULTREX-COMBO-US-IP-BT/2403120.uts?slotId=0 published prior to Feb. 15, 2018.

(Continued)

*Primary Examiner* — Jonathan M Dager  
(74) *Attorney, Agent, or Firm* — Samuel M. Korte; Max M. Ali

(57) ABSTRACT

A control system for navigating a marine vessel employs at least a first motor and a second motor. The control system is configured to communicate with the first and second motors. The control system is configured to receive a position measurement and an orientation measurement for the marine vessel. The control system is further configured to generate at least one control signal for the first motor based on the position measurement and at least one control signal for the second motor based on the orientation measurement.

16 Claims, 19 Drawing Sheets

(51) Int. Cl.
    *B63H 25/42*     (2006.01)
    *B63H 25/46*     (2006.01)

(56) References Cited

U.S. PATENT DOCUMENTS

| | | |
|---|---|---|
| 5,892,338 A | 4/1999 | Moore et al. |
| 6,126,497 A | 10/2000 | Stockton |
| 6,431,923 B1 | 8/2002 | Knight et al. |
| 6,468,117 B1 | 10/2002 | Healey |
| 7,538,511 B2 | 5/2009 | Samek |
| 7,882,791 B2 | 2/2011 | Huntt |
| 8,761,976 B2 | 6/2014 | Salmon et al. |
| 8,991,280 B2 | 3/2015 | Wireman |
| 9,195,234 B2* | 11/2015 | Stephens .............. G05D 1/0208 |
| 9,290,256 B1* | 3/2016 | Wireman ............... B63H 20/12 |
| 9,440,724 B2* | 9/2016 | Suzuki ................. G05D 1/0206 |
| 9,676,462 B2* | 6/2017 | Bernloehr ............. B63H 25/02 |
| 9,988,134 B1* | 6/2018 | Gable ................... B63B 79/40 |
| 10,281,576 B2 | 5/2019 | DePasqua |
| 10,336,425 B2 | 7/2019 | Laster |
| 10,513,322 B2 | 12/2019 | Clark et al. |
| 10,739,771 B2 | 8/2020 | Miller et al. |
| 10,759,507 B2* | 9/2020 | Hartman ................ B63B 1/16 |
| 2005/0263058 A1* | 12/2005 | Suemori ................ B63H 20/12<br>114/144 R |
| 2006/0116796 A1* | 6/2006 | Fossen .................. B63B 79/20<br>701/1 |
| 2007/0073454 A1* | 3/2007 | Kaji ..................... G05D 1/0206<br>701/21 |
| 2007/0089660 A1* | 4/2007 | Bradley ................. B63H 21/22<br>114/144 A |
| 2007/0162207 A1* | 7/2007 | Shimo .................. G05D 1/0206<br>701/42 |
| 2007/0178779 A1* | 8/2007 | Takada .................. B63H 21/22<br>114/144 RE |
| 2008/0169779 A1* | 7/2008 | Samek ................. B63H 20/007<br>318/588 |
| 2009/0037040 A1* | 2/2009 | Salmon ................. B63H 21/24<br>701/21 |
| 2009/0171520 A1* | 7/2009 | Kaji ..................... G05D 1/0206<br>701/21 |
| 2010/0023192 A1* | 1/2010 | Rae ........................ B63H 25/04<br>342/357.74 |
| 2010/0138083 A1* | 6/2010 | Kaji ..................... B63H 25/02<br>701/21 |
| 2010/0145558 A1* | 6/2010 | Kaji ..................... G05D 1/0206<br>701/21 |
| 2011/0153126 A1* | 6/2011 | Arbuckle ............... B63H 21/22<br>701/21 |
| 2011/0166724 A1* | 7/2011 | Hiramatsu ............. B63H 25/42<br>702/85 |
| 2011/0172858 A1* | 7/2011 | Gustin ................. B63H 21/213<br>701/21 |
| 2012/0014220 A1* | 1/2012 | DePasqua ........... G01S 7/52053<br>367/88 |
| 2012/0015566 A1* | 1/2012 | Salmon ................ G05D 1/0206<br>701/467 |
| 2012/0072059 A1* | 3/2012 | Glaeser .................... G08G 3/00<br>701/21 |
| 2012/0129410 A1* | 5/2012 | Tyers .................... B63H 21/21<br>440/1 |
| 2012/0232719 A1* | 9/2012 | Salmon .................. G01S 15/88<br>701/2 |
| 2015/0089427 A1* | 3/2015 | Akuzawa ............. G05D 1/0206<br>715/771 |
| 2015/0346730 A1* | 12/2015 | Stephens .............. G05D 1/0208<br>701/530 |
| 2016/0016651 A1* | 1/2016 | Anderson ............. G05D 1/0206<br>701/2 |
| 2016/0101838 A1* | 4/2016 | Kojima .................. B63H 49/00<br>701/466 |
| 2016/0246300 A1* | 8/2016 | Langford-Wood ........................<br>G05D 1/0206 |
| 2016/0252907 A1* | 9/2016 | Parkinson ............ G05D 1/0206<br>701/21 |
| 2016/0334792 A1* | 11/2016 | Jopling ................ G05D 1/0206 |
| 2017/0205828 A1* | 7/2017 | Estabrook ............. B63H 25/38 |
| 2017/0205829 A1* | 7/2017 | Tyers ..................... B63H 25/04 |
| 2017/0210449 A1* | 7/2017 | Frisbie .................... B63B 49/00 |
| 2017/0253314 A1* | 9/2017 | Ward ..................... B63H 25/42 |
| 2017/0255200 A1* | 9/2017 | Arbuckle ............. G05D 1/0206 |
| 2017/0277189 A1* | 9/2017 | Johnson ................ B63H 25/06 |
| 2017/0349257 A1* | 12/2017 | Hara ....................... B63H 21/21 |
| 2017/0365175 A1* | 12/2017 | Harnett .................. B63H 20/14 |
| 2018/0015994 A1* | 1/2018 | Kishimoto ............ B63H 25/46 |
| 2018/0057131 A1* | 3/2018 | Steward ................ B63H 20/12 |
| 2018/0057132 A1* | 3/2018 | Ward ..................... B63H 25/42 |
| 2019/0155288 A1* | 5/2019 | Arbuckle ............... B63B 79/15 |
| 2019/0176950 A1* | 6/2019 | Whiteside ............ G05D 1/0208 |
| 2019/0179318 A1* | 6/2019 | Miller ................... G05D 1/0208 |
| 2019/0204837 A1* | 7/2019 | Estabrook ............. B63H 25/12 |
| 2019/0322340 A1* | 10/2019 | Clark ....................... G01S 15/96 |
| 2019/0361457 A1* | 11/2019 | Johnson ............... G05D 1/0206 |
| 2020/0272152 A1* | 8/2020 | Combs .................. B63H 20/12 |
| 2020/0333786 A1 | 10/2020 | Miller et al. |

OTHER PUBLICATIONS

Printout from https://www.cabelas.com/product/MOTORGUIDE-XI-W-PINPOINT-GPS-BOW-MOUNT/1701905.uts?slotId=0 published prior to Feb. 15, 2018.

\* cited by examiner

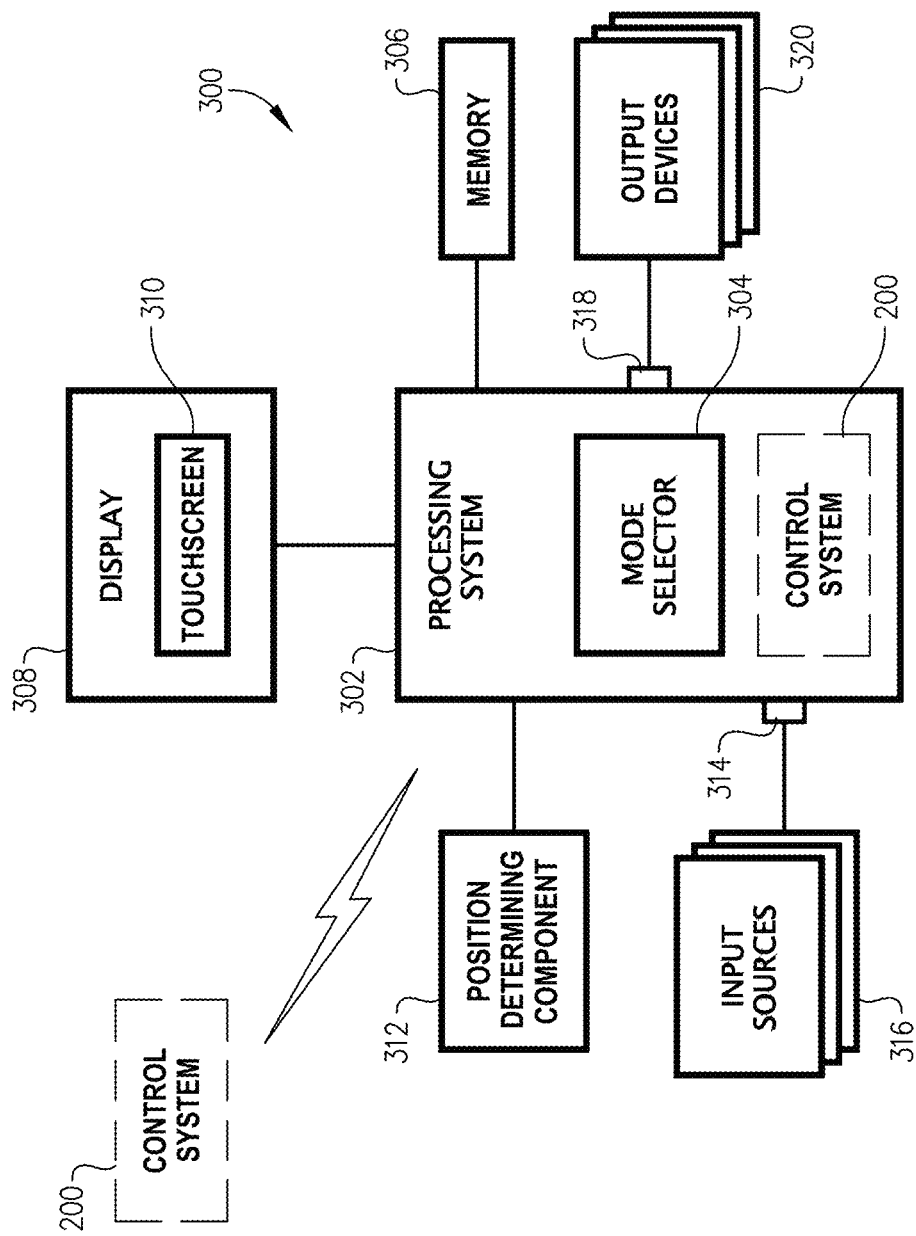

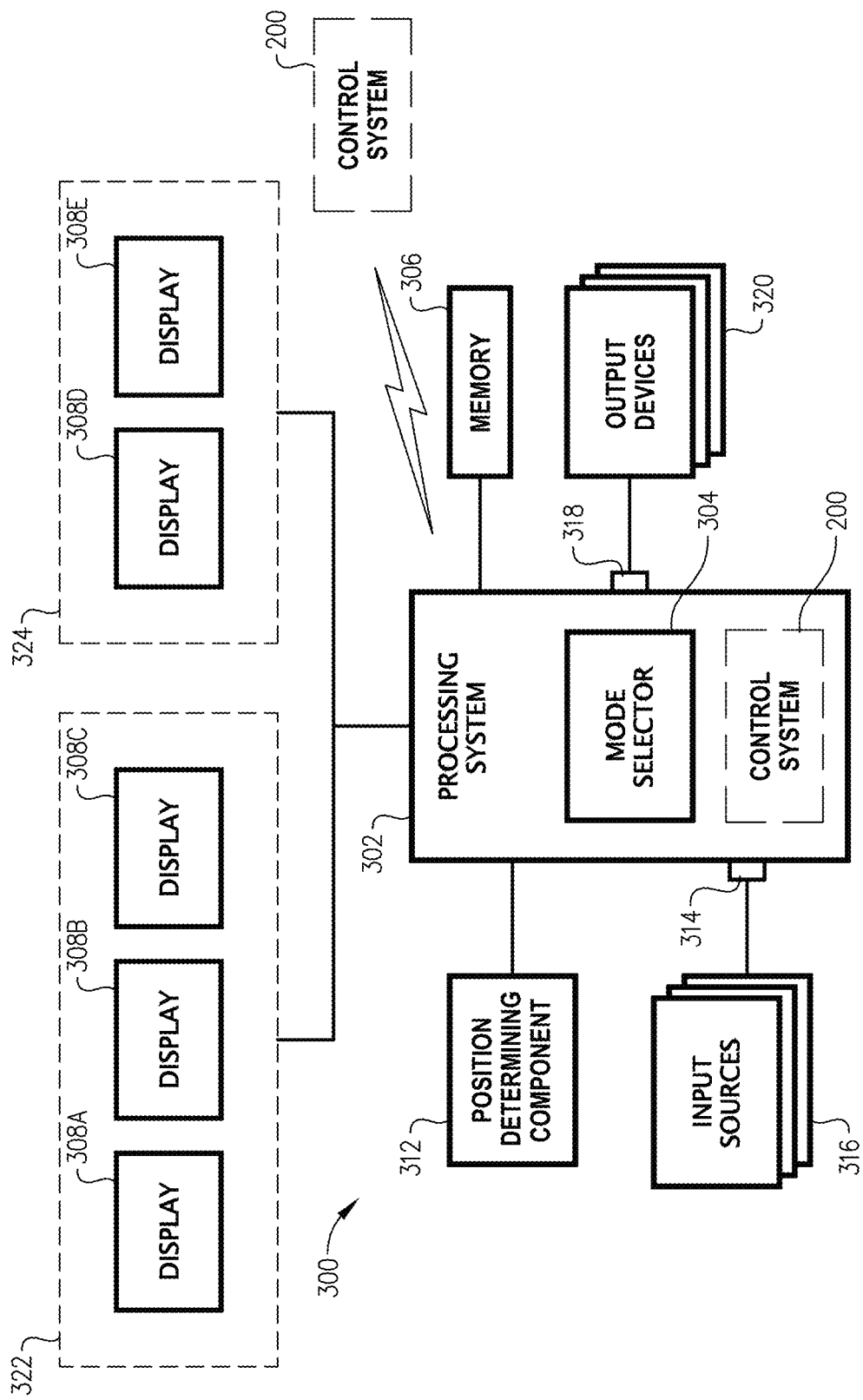

MULTIPLE MOTOR CONTROL SYSTEM FOR NAVIGATING A MARINE VESSEL

RELATED APPLICATION

The present application is a continuation of, and claims priority benefit to, co-pending and commonly assigned U.S. non-provisional application entitled "MULTIPLE MOTOR CONTROL SYSTEM FOR NAVIGATING A MARINE VESSEL," application Ser. No. 16/946,701, filed Jul. 1, 2020, which in turn is a continuation of, and claims priority benefit to, co-pending and commonly assigned U.S. non-provisional application entitled "MULTIPLE MOTOR CONTROL SYSTEM FOR NAVIGATING A MARINE VESSEL," application Ser. No. 15/897,922, filed Feb. 15, 2018, which in turn claims the benefit under 35 U.S.C. § 119(e) of U.S. Provisional Application Ser. No. 62/596,994, filed Dec. 11, 2017, and entitled "FOOT PEDAL DEVICE FOR CONTROLLING A TROLLING MOTOR." The above-referenced applications are here herein incorporated by reference in their entirety.

BACKGROUND

A marine vessel can employ one or more motors to navigate the marine vessel. For example, a marine vessel typically has a primary motor (e.g., a propulsion motor) that actuates the marine vessel through the water. In some cases, a marine vessel can further include at least one secondary motor (e.g., a trolling motor) that can be used instead of or in addition to the propulsion motor in certain situations. For example, a trolling motor may be used instead of the propulsion motor when navigating the marine vessel through environments that require precision (e.g., navigating around obstacles and/or in shallow water).

SUMMARY

A multiple motor control system for navigating a marine vessel is disclosed. In embodiments, the control system employs at least two motors (e.g., at least a first motor and a second motor) to navigate the marine vessel by controlling the position and orientation (e.g., angle and/or heading) of the marine vessel. For example, the motors can include two trolling motors, a trolling motor and a thruster, a trolling motor and a propulsion motor, or any other combination of two or more motors. The control system includes at least one controller in communication with the first motor and the second motor. The control system is configured to receive a position measurement and an orientation measurement for the marine vessel. The control system is further configured to generate at least one control signal for the first motor based on the position measurement and at least one control signal for the second motor based on the orientation measurement.

A method for navigating a marine vessel with two or more motors is also disclosed. The method employs at least two motors (e.g., at least a first motor and a second motor) to navigate the marine vessel by controlling the position and orientation (e.g., angle and/or heading) of the marine vessel. In implementations, the method includes: receiving a position measurement for the marine vessel; receiving an orientation measurement for the marine vessel; generating at least one first control signal for the first motor based on the position measurement for the marine vessel; and generating at least one second control signal for the second motor based on the orientation measurement for the marine vessel.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 9A is a block diagram of a marine vessel display system that at least partially includes or is in communication with a control system, such as the control system illustrated in any of FIGS. 5A through 5D, FIG. 7, or a combination thereof, in accordance with an example embodiment of the present disclosure.

FIG. 9B is a block diagram of a marine vessel display system that at least partially includes or is in communication with a control system, such as the control system illustrated in any of FIGS. 5A through 5D, FIG. 7, or a combination thereof, where the marine vessel display system includes multiple displays and/or display stations, in accordance with an example embodiment of the present disclosure.

DETAILED DESCRIPTION

Figure 1:
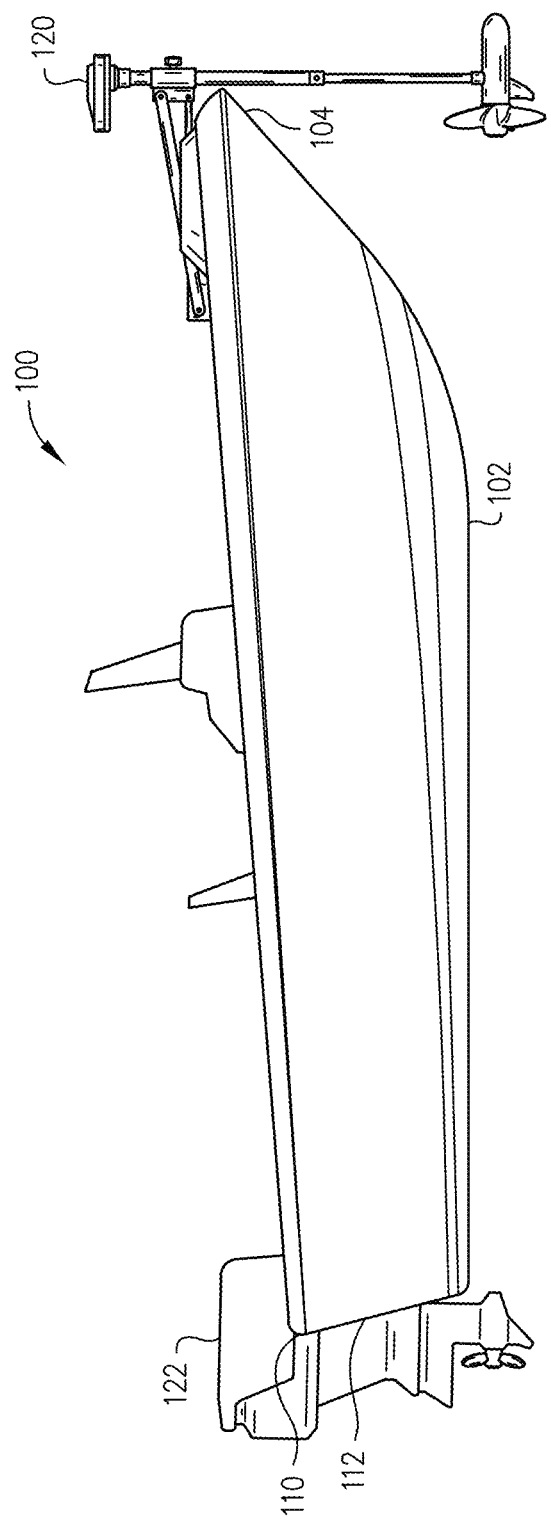
FIG. 1 is a side view of a marine vessel that can employ a multiple motor control system, in accordance with an example embodiment of the present disclosure.

A marine vessel (e.g., a boat) employs one or more motors to navigate the marine vessel through the water. For example, the marine vessel includes a primary motor (e.g., a propulsion motor) that actuates the marine vessel through the water. In embodiments, the marine vessel further includes at least one secondary motor (e.g., a trolling motor and/or thruster) that can be used instead of or in addition to the propulsion motor. For example, a trolling motor may be used instead of the propulsion motor when navigating the marine vessel through environments that require precision (e.g., navigating around obstacles and/or in shallow water). Another example is where a trolling motor can be used to steer the marine vessel while the propulsion motor actuates the marine vessel in a forward or backward direction. Similarly, a thruster can be used in addition to or instead of the propulsion motor and/or thruster to actuate the marine vessel or a portion thereof (e.g., the bow or stern) in a first or second direction (e.g., to the right or left).

A trolling motor (or possibly the propulsion motor) may be used to control (e.g., maintain or navigate towards) a position of the marine vessel. For example, the trolling motor can actuate the marine vessel in a manner that maintains the trolling motor at a fixed (or substantially fixed) position in the water. However, while doing so, the trolling motor is unable to maintain the orientation of the marine vessel in a fixed (or substantially fixed) orientation because the marine vessel can pivot around the trolling motor. The same is true with regard to any reference point of the marine vessel (e.g., a reference point based on a position of another motor, a center of the marine vessel, etc.). It can be advantageous to control the position and orientation of the marine vessel, for example, the keep the marine vessel at a position without it turning or rotating. For example, controlling the position and orientation of a fishing boat can help to avoid tangled lines or situations in which an individual is required to move to another position on the fishing boat in order to cast his/her line.

A multiple motor control system for navigating a marine vessel is disclosed herein, wherein a control system employs at least two motors (e.g., at least a first motor and a second motor) to navigate the marine vessel by controlling the positon and orientation (e.g., angle and/or heading) of the marine vessel. For example, the motors can include two trolling motors, a trolling motor and a thruster, a trolling motor and a propulsion motor, or any other combination of two or more motors. The control system includes at least one controller in communication with the first motor and the second motor. The control system is configured to receive a position measurement and an orientation measurement for the marine vessel. The control system is further configured to generate at least one control signal for the first motor based on the position measurement and at least one control signal for the second motor based on the orientation measurement.

FIGS. 1 through 8C illustrate embodiments of a marine vessel 100 and a control system 200 for the marine vessel 100. As shown in FIG. 1, the marine vessel 100 has at least one propulsion motor 122 that is the primary source of propulsion for navigating the marine vessel 100 through the water. In an embodiment, the propulsion motor 122 can be mounted to a rear portion (e.g., stern 110 and/or transom 112) of the marine vessel 100. In the embodiment shown in FIG. 1, the marine vessel 100 is also shown to include a trolling motor 120. For example, the trolling motor 120 may be mounted to a front portion (e.g., bow 104) of the marine vessel 100 (e.g., as shown in FIG. 2A). The trolling motor 120 can be operable in parallel with (e.g., as the same time as) the propulsion motor 122 to enhance steering capabilities of the marine vessel 100. In other situations, the trolling motor 120 may be operable instead of the propulsion motor 122 to navigate the marine vessel 100 at slower speeds and/or with greater precision (e.g., when navigating around obstacles, in shallow water, or the like). In some situations, the trolling motor 120 may be employed to navigate the marine vessel 100 instead of the propulsion motor 122 in order to reduce turbulence resulting from the marine vessel 100 as it is navigated through the water. For example, reduced turbulence may be desirable to avoid scaring away fish or avoid damage to aquatic environments.

Figure 2A:
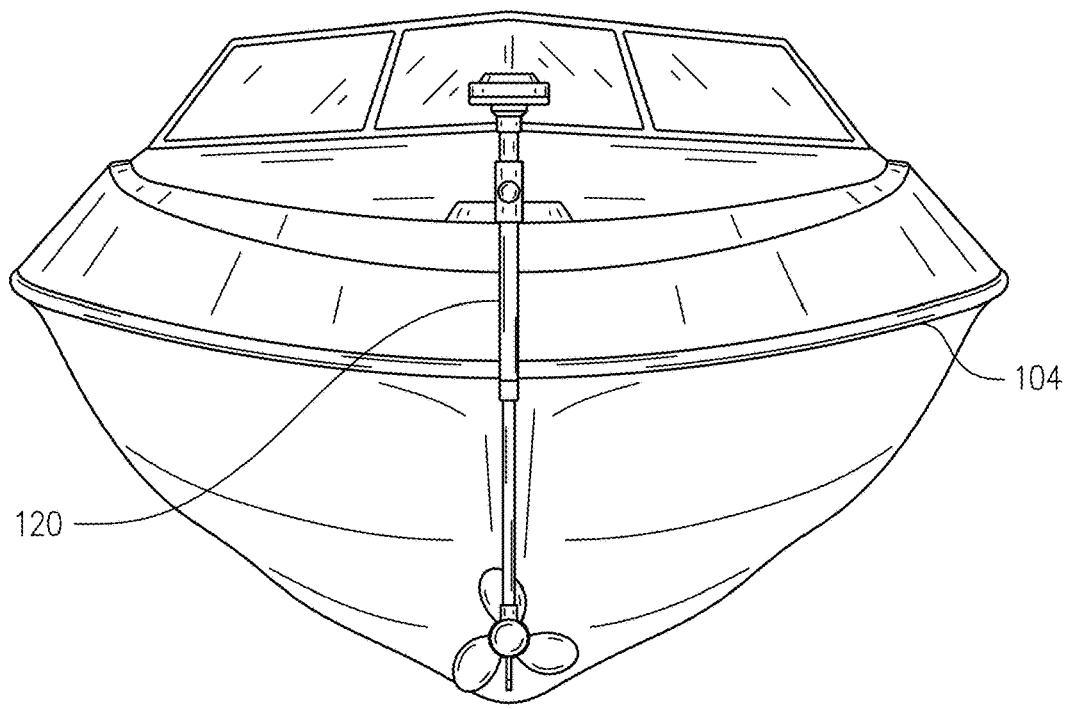
FIG. 2A is a front view of a marine vessel, such as the marine vessel illustrated in FIG. 1, with a front-mounted trolling motor, in accordance with an example embodiment of the present disclosure.
Figure 2B:
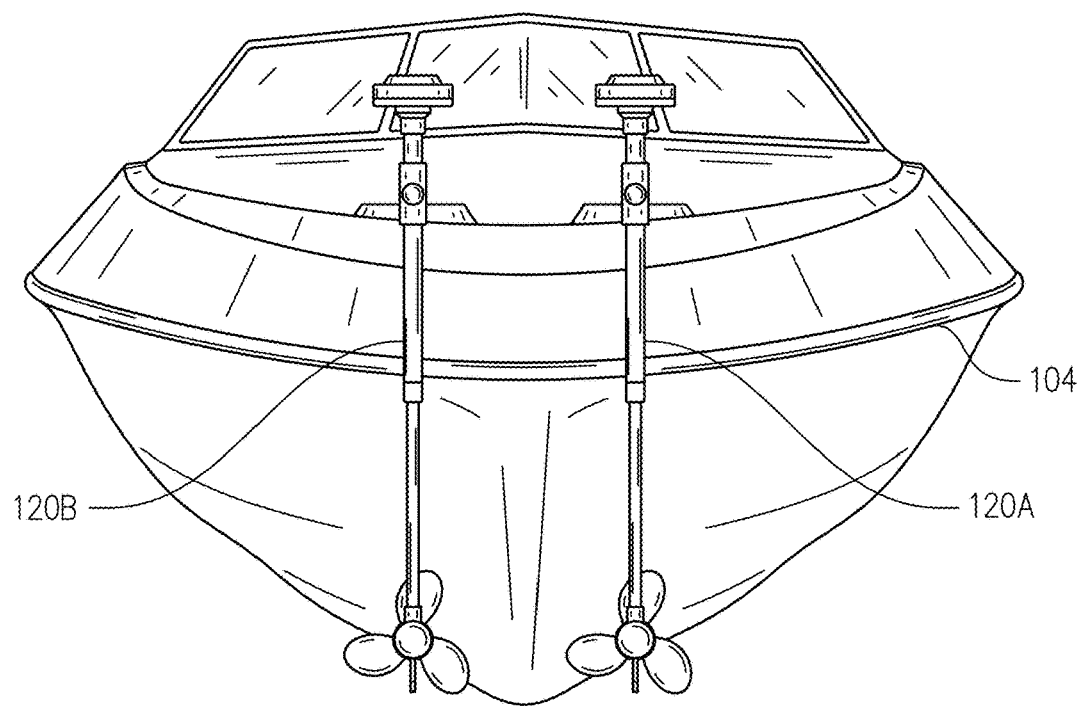
FIG. 2B is a front view of a marine vessel, such as the marine vessel illustrated in FIG. 1, with two front-mounted trolling motors, in accordance with an example embodiment of the present disclosure.
Figure 3A:
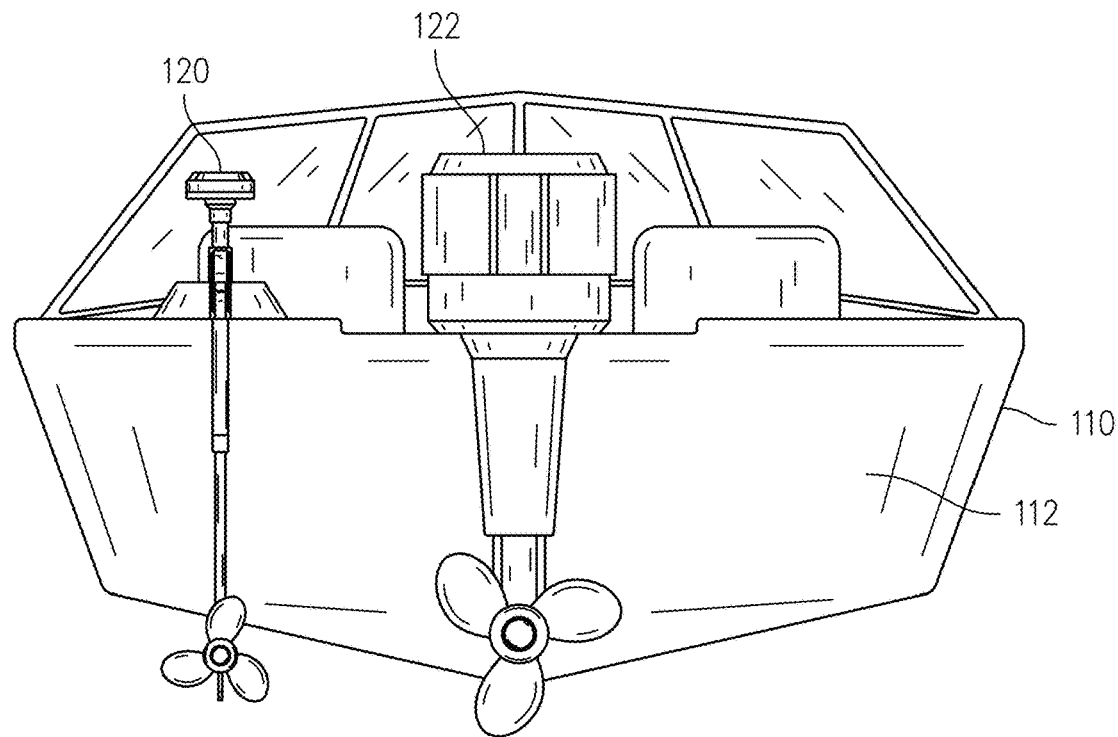
FIG. 3A is a rear view of a marine vessel, such as the marine vessel illustrated in FIG. 1, with a rear-mounted trolling motor, in accordance with an example embodiment of the present disclosure.
Figure 3B:
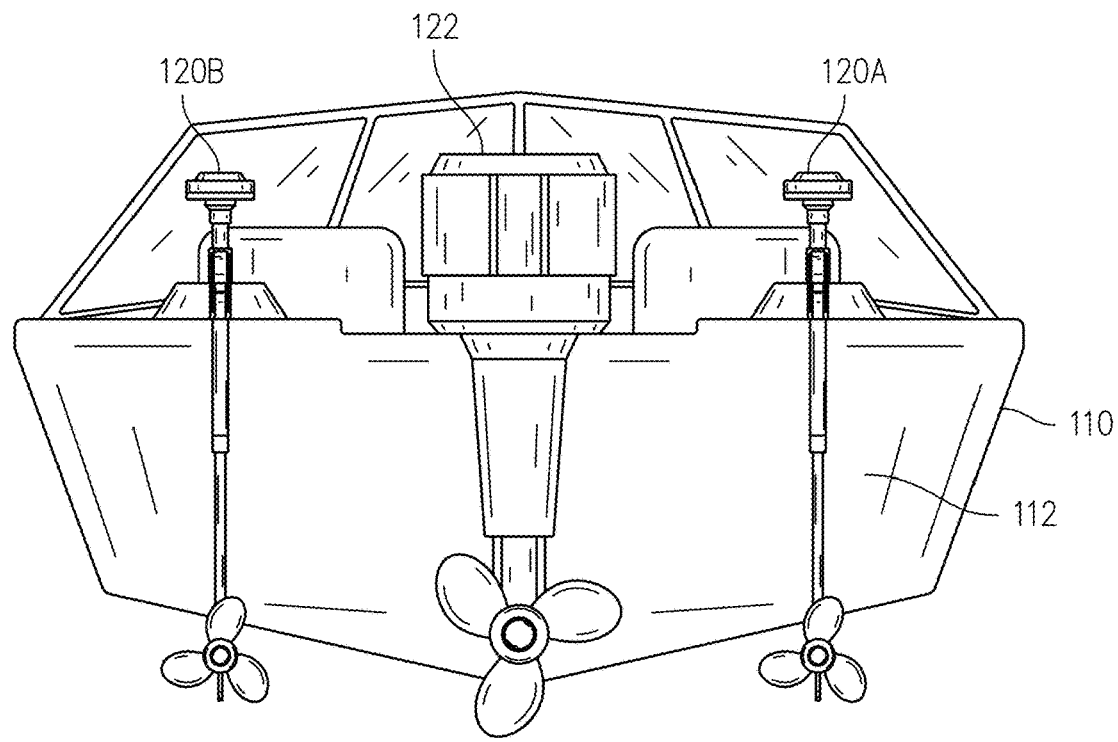
FIG. 3B is a rear view of a marine vessel, such as the marine vessel illustrated in FIG. 1, with two rear-mounted trolling motors, in accordance with an example embodiment of the present disclosure.

While a single front-mounted trolling motor 120 is shown in FIGS. 1 and 2A, the trolling motor 120 can be mounted to other portions of the marine vessel 120 (e.g., affixed to other portions of the marine vessel's hull 102). In an embodiment, the trolling motor 120 can be mounted to a rear portion (e.g., stern 110 and/or transom 112) of the marine vessel 100 (e.g., as shown in FIG. 3A). For example, the trolling motor 120 can be mounted in proximity to (e.g., alongside) the propulsion motor 122 at the stern 110 and/or transom 112 of the marine vessel 100. In some embodiments, the marine vessel 100 can have a plurality of trolling motors 120 for additional power and/or enhanced steering capability. For example, in an embodiment shown in FIG. 2B, the marine vessel 100 has two trolling motors (e.g., motors 120A and 120B) mounted to a front portion (e.g., bow 104) of the marine vessel 100. In an embodiment shown in FIG. 3B, the marine vessel 100 has two trolling motors (e.g., motors 120A and 120B) mounted to a rear portion (e.g., stern 110 and/or transom 112) of the marine vessel 100. In other embodiments, the marine vessel 100 can have at least one front-mounted trolling motor 120 and at least one rear-mounted trolling motor 120. The foregoing embodiments are provided by way of example. The propulsion motor(s) 122 and trolling motor(s) 120 may be mounted in proximity to any location on the marine vessel 100 (e.g., at or near the bow 104, stern 110, starboard 108 or port 106 of the marine vessel 100) depending on the marine vessel 100 in which the motors are implemented.

Figure 4A:
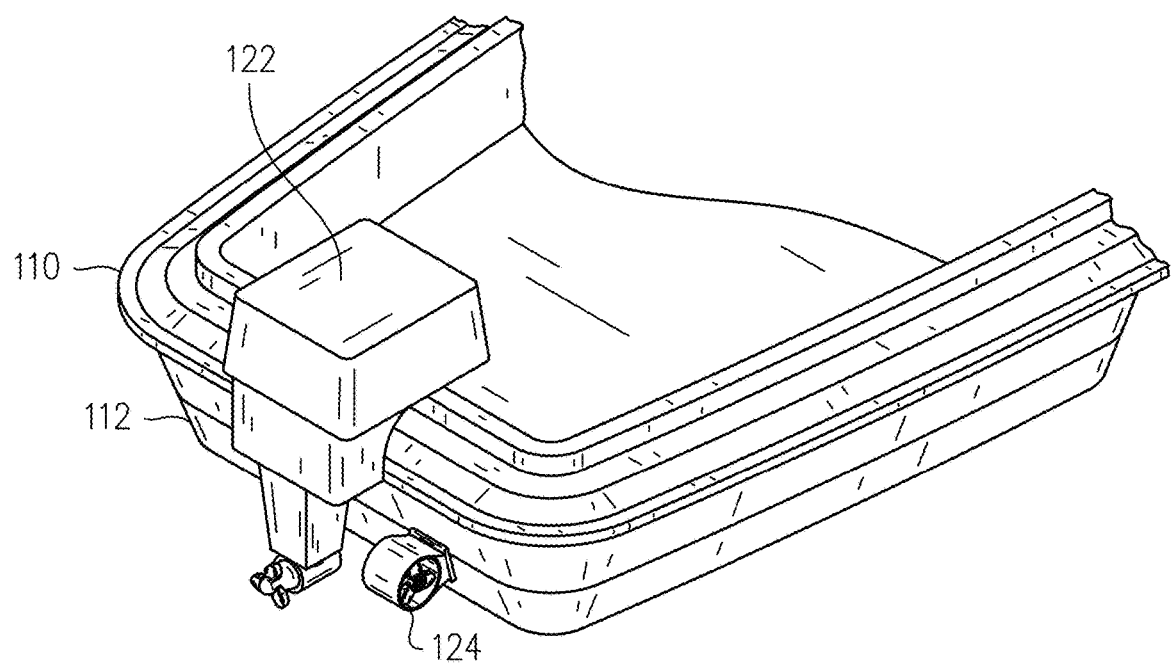
FIG. 4A is a perspective view of a rear portion of a marine vessel, such as the marine vessel illustrated in FIG. 1, with a rear-mounted thruster, in accordance with an example embodiment of the present disclosure.
Figure 4B:
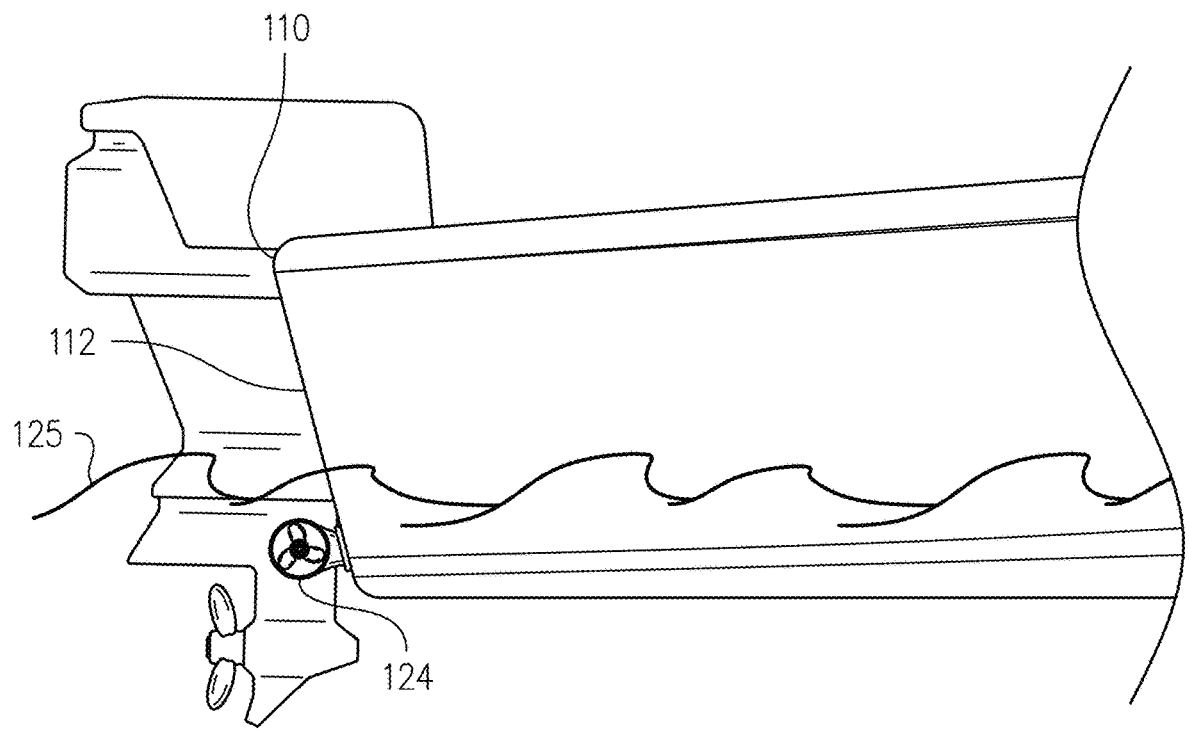
FIG. 4B is a side view of a rear portion of the marine vessel, such as the marine vessel illustrated in FIG. 1, with a rear-mounted thruster, in accordance with an example embodiment of the present disclosure.

FIGS. 4A and 4B show embodiments of the marine vessel 100 with at least one thruster 124 mounted to the hull 102 of the marine vessel 100. For example, the thruster 124 may be mounted in proximity to a rear portion (e.g., at or near the transom 112) of the marine vessel 100. The thruster 124 can be mounted to a portion of the marine vessel 100 that is configured to be below the water's surface 125 when the marine vessel 100 is in the water. In embodiments, the thruster 124 is rigidly affixed to a portion of the hull 102 that is configured to be below the water's surface 125 (e.g., as shown in FIG. 4B). In embodiments, one or more thrusters 124 are configured to actuate the stern 110 of the marine vessel in a first direction (e.g., to the right) or a second direction (e.g., to the left) when the one or more thrusters 124 are active. In other embodiments, one or more thrusters 124 (e.g., one or more thrusters 124 mounted to a front portion of the marine vessel 100) are configured to actuate the bow 104 of the marine vessel in a first direction (e.g., to the right) or a second direction (e.g., to the left) when the one or more thrusters 124 are active. For example, at least one thruster 124 may be mounted in proximity to a front portion (e.g., bow 104) of the marine vessel 100 and/or in proximity to the starboard 108 or port 106. In some embodiments, at least one thruster 124 is mounted to a rear portion of the marine vessel 100 (e.g., as shown in FIGS. 4A and 4B) and at least one thruster is mounted to a front portion of the marine vessel 100 (e.g., at or near the bow 104). In such embodiments, the thrusters 124 are configured to selectively actuate the bow 104, the stern 110, or the marine vessel 100 in its entirety in a first direction (e.g., to the right) or a second direction (e.g., to the left) when some of the thrusters 124 (e.g., front or rear thrusters) or all of the thrusters 124 (e.g., front and rear) are active. The marine vessel 100 may employ one or more thrusters 124 for enhanced steering or control of the marine vessel 100 to help navigate through turbulent waters, for enhanced control when navigating the marine vessel 100 around obstacles, when parking the marine vessel 100, or in any other situation where it can be advantageous to actuate the marine vessel 100 or a portion (e.g., bow 104 or stern 110) of the marine vessel 100 in a generally left or right direction.

The marine vessel 100 can have any combination of propulsion motor(s) 122, trolling motor(s) 120, and thruster(s) 124 for navigating the marine vessel 100 through the water. For example, in an embodiment, the marine vessel 100 includes at least one propulsion motor 122 or at least one trolling motor 120 for navigating the marine vessel 100 through the water 100. In another embodiment, the marine vessel 100 includes at least one propulsion motor 122 and at least one trolling motor 120. In yet another embodiment, the marine vessel 100 includes at least one propulsion motor 122 and at least one thruster 124, or at least one trolling motor 120 and at least one thruster 124. Still in other embodiments, the marine vessel 100 includes at least one propulsion motor 122, at least one trolling motor 120, and at least one thruster 124.

Figure 5A:
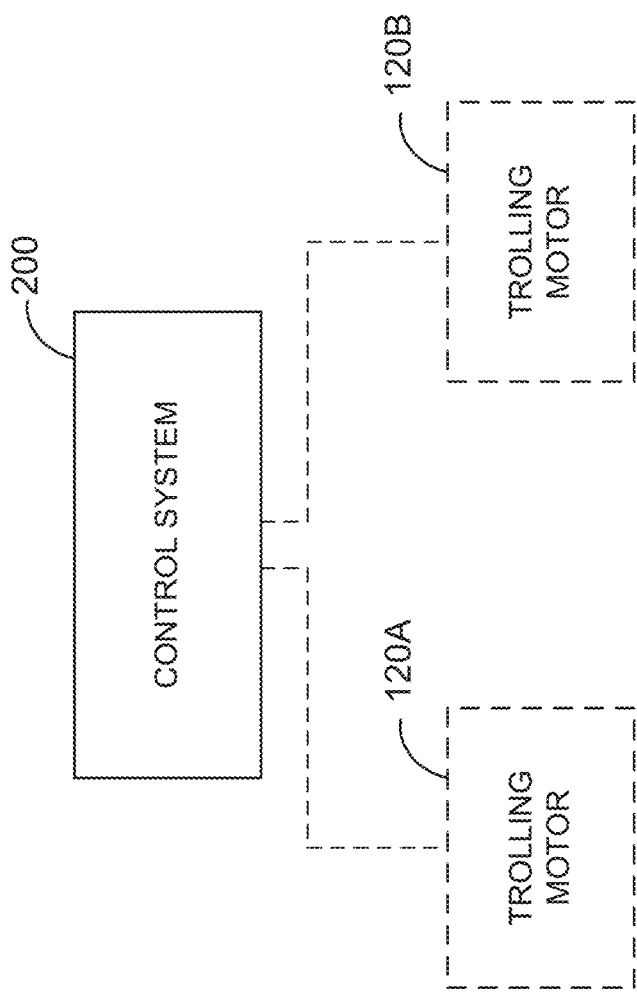
FIG. 5A is a block diagram illustrating a control system for navigating a marine vessel, such as the marine vessel illustrated in any of FIGS. 1 through 4B or FIGS. 8A through 8C, or a combination thereof, where the control system is configured to control a first trolling motor and a second trolling motor, in accordance with an example embodiment of the present disclosure.
Figure 5B:
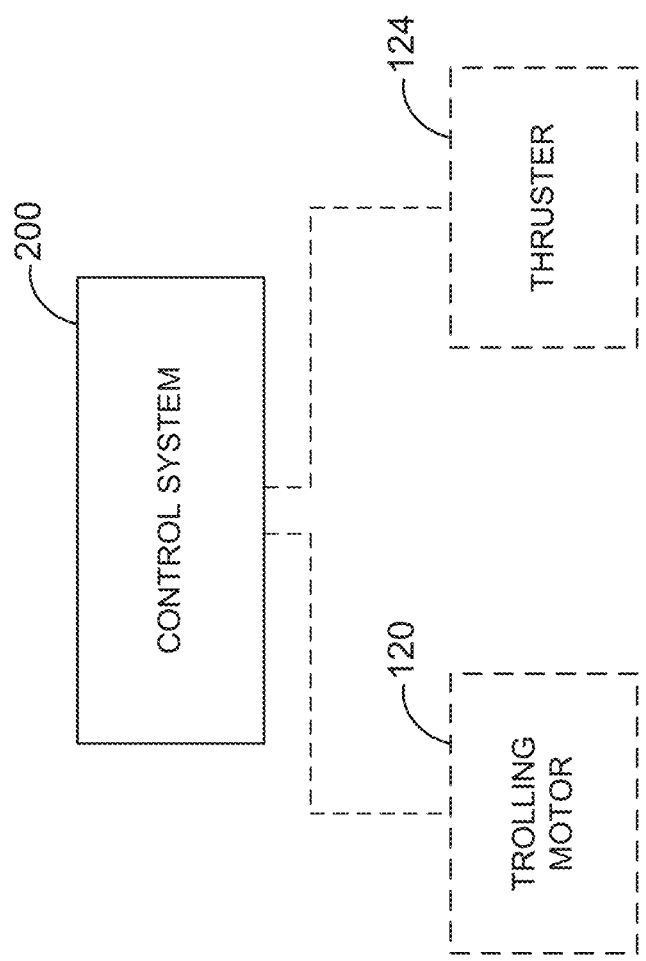
FIG. 5B is a block diagram illustrating a control system for navigating a marine vessel, such as the marine vessel illustrated in any of FIGS. 1 through 4B or FIGS. 8A through 8C, or a combination thereof, where the control system is configured to control a trolling motor and a thruster, in accordance with an example embodiment of the present disclosure.
Figure 5C:
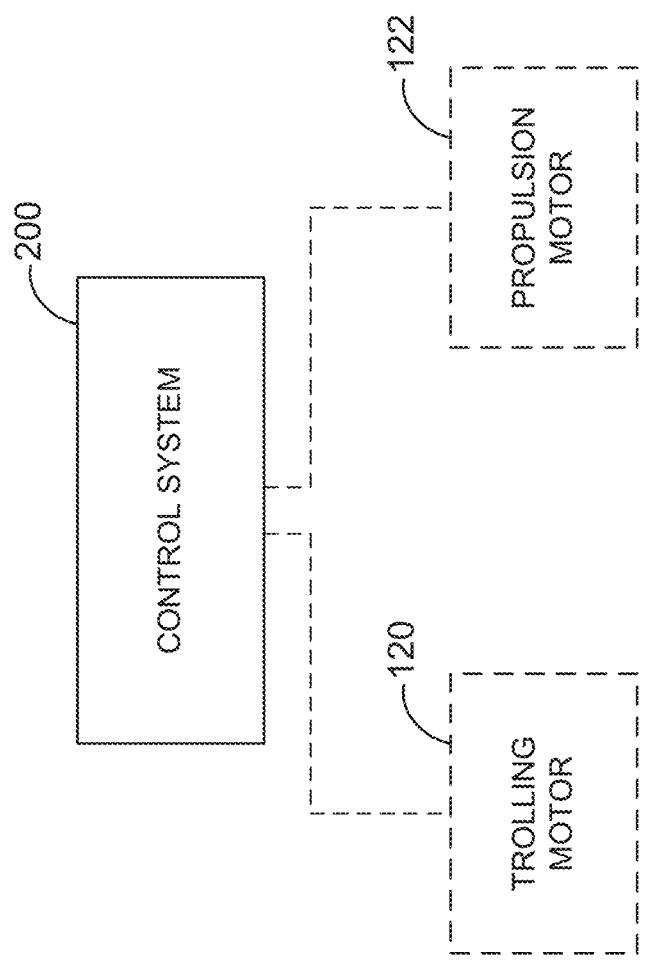
FIG. 5C is a block diagram illustrating a control system for navigating a marine vessel, such as the marine vessel illustrated in any of FIGS. 1 through 4B or FIGS. 8A through 8C, or a combination thereof, where the control is configured to control a trolling motor and a propulsion motor, in accordance with an example embodiment of the present disclosure.

FIGS. 5A through 5D show example embodiments of the control system 200 that is employed to control the marine vessel 100 motors (e.g., trolling motor(s) 120, propulsion motor(s) 122, and/or thruster(s) 124). The control system 200 is configured to control at least a first motor and a second motor. For example, in an embodiment shown in FIG. 5A, the control system 200 is configured to control a first trolling motor 120A and a second trolling motor 120B. The trolling motors 120A and 120B can be front-mounted, rear-mounted, or at least one trolling motor (e.g., motor 120A) can be front-mounted and at least one trolling motor (e.g., motor 120B) can be rear-mounted. In another example embodiment shown in FIG. 5B, the control system 200 is configured to control at least one trolling motor 120 (e.g., at least one front-mounted trolling motor and/or at least one rear-mounted trolling motor) and at least one thruster 124 (e.g., at least one front-mounted thruster and/or at least one rear-mounted thruster). Another example embodiment is shown in FIG. 5C, where the control system 200 is configured to control at least one trolling motor 120 and at least one propulsion motor 122. The control system 200 is configured to control any combination of two motors, including, but not limited to the foregoing embodiments.

Figure 5D:
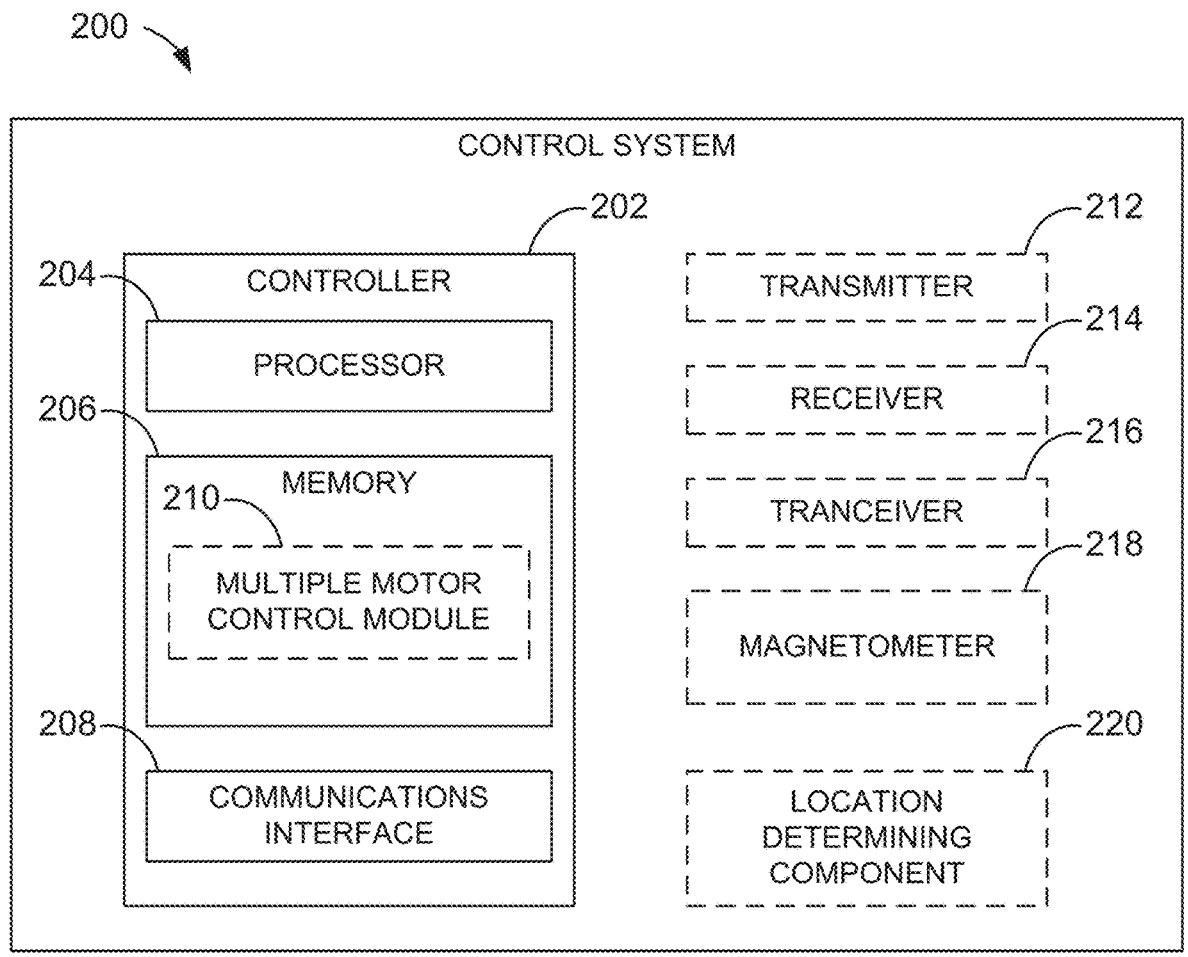
FIG. 5D is a block diagram illustrating components of a control system for navigating a marine vessel, such as the control system illustrated in any of FIGS. 5A through 5C, or a combination thereof, in accordance with an example embodiment of the present disclosure.

As shown in FIG. 5D, the control system 200 may include one or more sensors for detecting an orientation, change in orientation, direction, change in direction, position, and/or change in position of the marine vessel 100. For example, the control system 200 may include a location determining component 220 that is configured to detect a position measurement for the marine vessel 100 (e.g., geographic coordinates of at least one reference point on the marine vessel 100, such as a motor location, center of the marine vessel 100, bow 104 location, stern 110 location, etc.). In an embodiment, the location determining component 220 is a global navigation satellite system (GNSS) receiver (e.g., a global positioning system (GPS) receiver, software defined (e.g., multi-protocol) receiver, or the like). In some embodiments, the control system 200 is configured to receive a position measurement from another device. For example, the control system 200 may be configured to receive a position measurement from an external location determining component/device or from at least one of the motors (e.g., from a trolling motor 120, propulsion motor 122, and/or thruster 124 of the marine vessel 100). In some embodiments, the control system 200 may include a magnetometer 218 configured to detect an orientation measurement for the marine vessel 100. For example, the magnetometer 218 can be configured to detect a direction in which the bow 104 of the marine vessel 100 is pointed and/or a heading of the marine vessel 100. The magnetometer 218 may be calibrated by pointing the magnetometer 218 in at least one reference direction (e.g., North, East, South, West, etc.), where the magnetometer 218 registers at least one reference direction and detects changes in the pointing direction or heading of the marine vessel 100 relative to the reference direction. In some embodiments, the control system 200 is configured to receive an orientation measurement from another device. For example, the control system 200 may be configured to receive an orientation measurement (e.g., a direction in which the bow 104 of the marine vessel 100 is pointed, a heading of the marine vessel 100, and/or vector coordinates defined by at least two reference points (e.g., motor locations, bow and stern locations, etc.)) from an external magnetometer, location determining component(s)/device(s), and/or the motors (e.g., trolling motor(s) 120, propulsion motor(s) 122, and/or thruster(s) 124) of the marine vessel 100. In some embodiments, the control system 200 includes or is communicatively coupled with at least one inertial sensor (e.g., accelerometer and/or gyroscope) for detecting the orientation or change in orientation of the marine vessel 100. For example, an inertial sensor can be used instead of or in addition to the magnetometer 218 to detect the orientation measurement for the marine vessel 100.

The control system 200 includes at least one controller 202 communicatively coupled to one or more components of the control system 200. For example, the controller 202 can be communicatively coupled to the location determining component 220 and the magnetometer 218. The controller 202 may be configured to receive the position measurement and the orientation measurement from the location determining component 220 and the magnetometer 218, respectively. In an embodiment, the controller 202 is configured to receive at least one of the measurements from another device. For example, the controller 202 may be configured to receive the position measurement and/or the orientation measurement from at least one of the motors (e.g., trolling motor(s) 120, propulsion motor(s) 122, and/or thruster(s) 124) of the marine vessel 100. For example, the controller 202 can receive the position measurement and/or the orientation measurement via a receiver 214 or transceiver 216 of the control system 200. In an embodiment, the control system 200 includes a wireless transceiver 216, wireless receiver 214, and/or wireless transmitter 212. In another embodiment, the control system 200 includes a wired transceiver 216, wired receiver 214, and/or wired transmitter 212. In some embodiments, the control system 200 includes a combination of wired and wireless communication protocols (e.g., transmitter(s) 212, receiver(s) 214, and/or transceiver(s) 216) for communicating with the motors (e.g., trolling motor(s) 120, propulsion motor(s) 122, and/or thruster(s) 124) and possibly with other devices on the marine vessel 100.

The controller 202 can be communicatively coupled with some or all of the components of the control system 200. The controller 202 has a processor 204 included with or in the controller 202 to control the components and functions of the control system 200 described herein using software, firmware, hardware (e.g., fixed logic circuitry), or a combination thereof. The terms "controller," "functionality," "service," and "logic" as used herein generally represent software, firmware, hardware, or a combination of software, firmware, or hardware in conjunction with controlling the control system 200. As shown in FIG. 5D, the controller 202 can include a processor 204, a memory 206, and a communications interface 208.

The processor 204 provides processing functionality for at least the controller 202 and can include any number of processors, micro-controllers, circuitry, field programmable gate array (FPGA) or other processing systems, and resident or external memory for storing data, executable code, and other information accessed or generated by the controller 202. The processor 204 can execute one or more software programs (e.g., multiple motor control module 210) embodied in a non-transitory computer readable medium (e.g., memory 206) that implement techniques described herein. The processor 204 is not limited by the materials from which it is formed or the processing mechanisms employed therein and, as such, can be implemented via semiconductor(s) and/or transistors (e.g., using electronic integrated circuit (IC) components), and so forth.

The memory 206 can be a tangible, computer-readable storage medium that provides storage functionality to store various data and or program code associated with operation of the controller 202, such as software programs and/or code segments, or other data to instruct the processor 204, and possibly other components of the control system 200/controller 202, to perform the functionality described herein. The memory 206 can store data, such as a program of instructions (e.g., multiple motor control module 210) for operating the control system 200 (including its components), and so forth. It should be noted that while a single memory 206 is described, a wide variety of types and combinations of memory (e.g., tangible, non-transitory memory) can be employed. The memory 206 can be integral with the processor 204, can comprise stand-alone memory, or can be a combination of both. Some examples of the memory 206 can include removable and non-removable memory components, such as random-access memory (RAM), read-only memory (ROM), flash memory (e.g., a secure digital (SD) memory card, a mini-SD memory card, and/or a microSD memory card), magnetic memory, optical memory, universal serial bus (USB) memory devices, hard disk memory, external memory, and so forth. In embodiments, the control system 200 and/or the memory 206 can include removable integrated circuit card (ICC) memory, such as memory provided by a subscriber identity module (SIM) card, a universal subscriber identity module (USIM) card, a universal integrated circuit card (UICC), and so on.

The communications interface 208 can be operatively configured to communicate with components of the control system 200. For example, the communications interface 208 can be configured to transmit data for storage in the control system 200, retrieve data from storage in the control system 200, and so forth. The communications interface 208 can also be communicatively coupled with the processor 204 to facilitate data transfer between components of the control system 200 and the processor 204 (e.g., for communicating inputs to the processor 204 received from a device communicatively coupled with the controller 202, including, but not limited to, data received from the magnetometer 218, location determining component 220, and/or any other component of the control system 200). It should be noted that while the communications interface 208 is described as a component of controller 202, one or more components of the communications interface 208 can be implemented as components of the control system 200 or components communicatively coupled to the control system 200 via a wired and/or wireless connection. For example, the control system 200 and/or the controller 202 can include a transmitter 212, a receiver 214, and/or a transceiver 216 for sending/receiving communications (e.g., control signals, position and/or orientation measurements, etc.) to/from the motors (e.g., trolling motor(s) 120, propulsion motor(s) 122, and/or thruster(s) 124, as shown in FIGS. 5A through 5C). For example, the transmitter 212, receiver 214, and/or transceiver 216 can be directly coupled (e.g., wired) to one or more of the motors (e.g., trolling motor(s) 120, propulsion motor(s) 122, and/or thruster(s) 124) or configured to wirelessly communicate with one or more of the motors (e.g., trolling motor(s) 120, propulsion motor(s) 122, and/or thruster(s) 124).

The control system 200 can also include and/or can connect to one or more input/output (I/O) devices (e.g., via the communications interface 208), such as a display, a mouse, a touchpad, a touchscreen, a keyboard, a microphone (e.g., for voice commands) and so on. In embodiments, the control system 200/communications interface 208 includes at least one input device configured to receive user inputs. For example, the input device can include, but is not limited to, an electromechanical input device (e.g., a button, switch, toggle, trackball, or the like), a touch-sensitive input device (e.g., a touchpad, touch panel, trackpad, or the like), a pressure-sensitive input device (e.g., a force sensor or force-sensitive touchpad, touch panel, trackpad, button, switch, toggle, trackball, or the like), an audio input device (e.g., microphone), a camera (e.g., for detecting user gestures, or for face/object recognition), or a combination thereof.

Figure 6A:
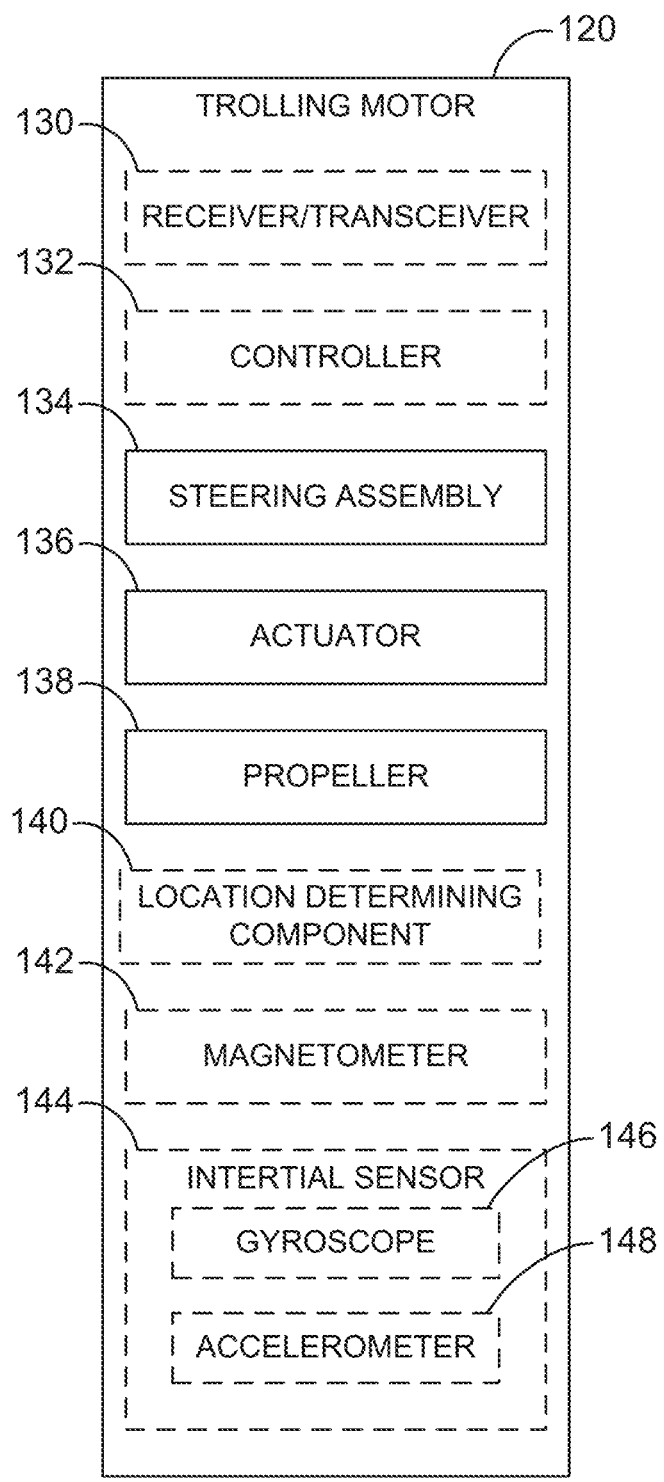
FIG. 6A is a block diagram illustrating components of a trolling motor that can be employed with a control system, such as the control system illustrated in any of FIGS. 5A through 5D, or a combination thereof, in accordance with an example embodiment of the present disclosure.
Figure 6B:
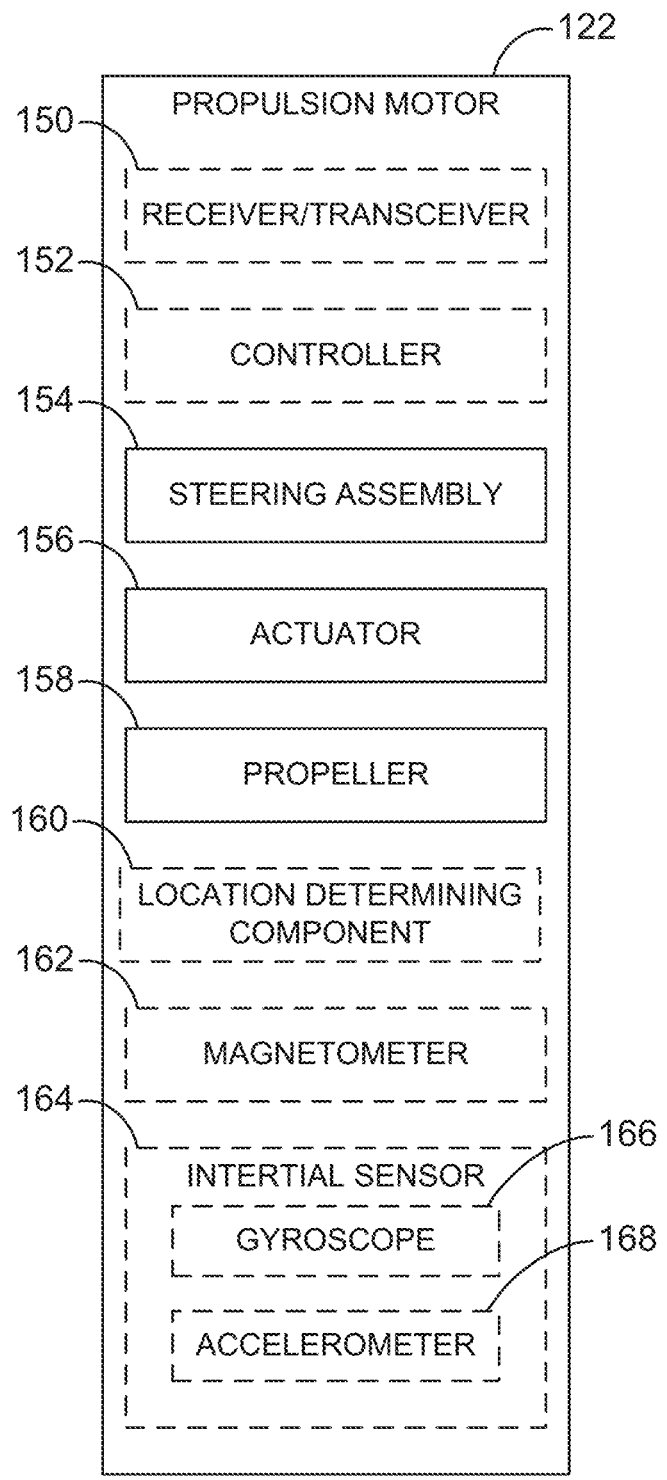
FIG. 6B is a block diagram illustrating components of a propulsion motor that can be employed with a control system, such as the control system illustrated in any of FIGS. 5A through 5D, or a combination thereof, in accordance with an example embodiment of the present disclosure.
Figure 6C:
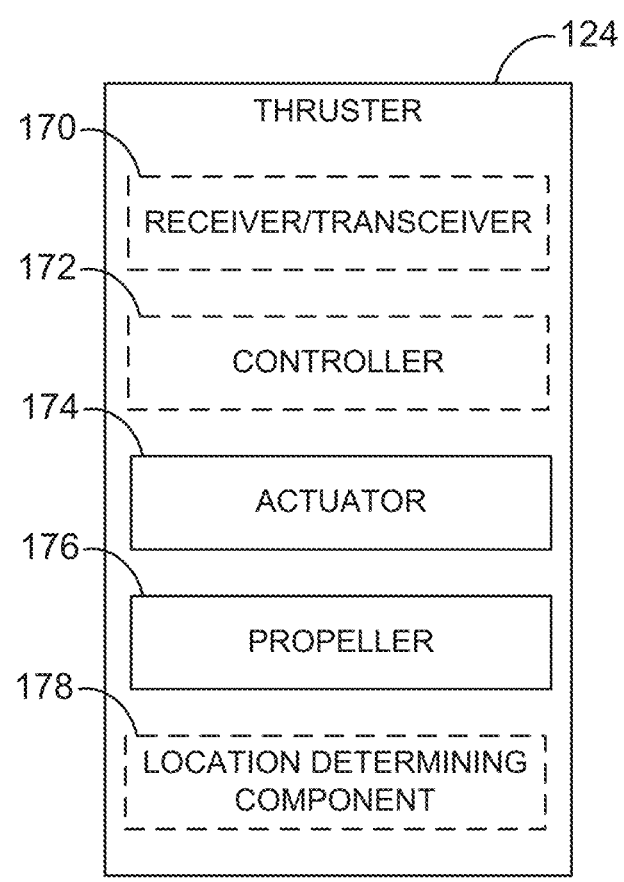
FIG. 6C is a block diagram illustrating components of a thruster that can be employed with a control system, such as the control system illustrated in any of FIGS. 5A through 5D, or a combination thereof, in accordance with an example embodiment of the present disclosure.
Figure 7:
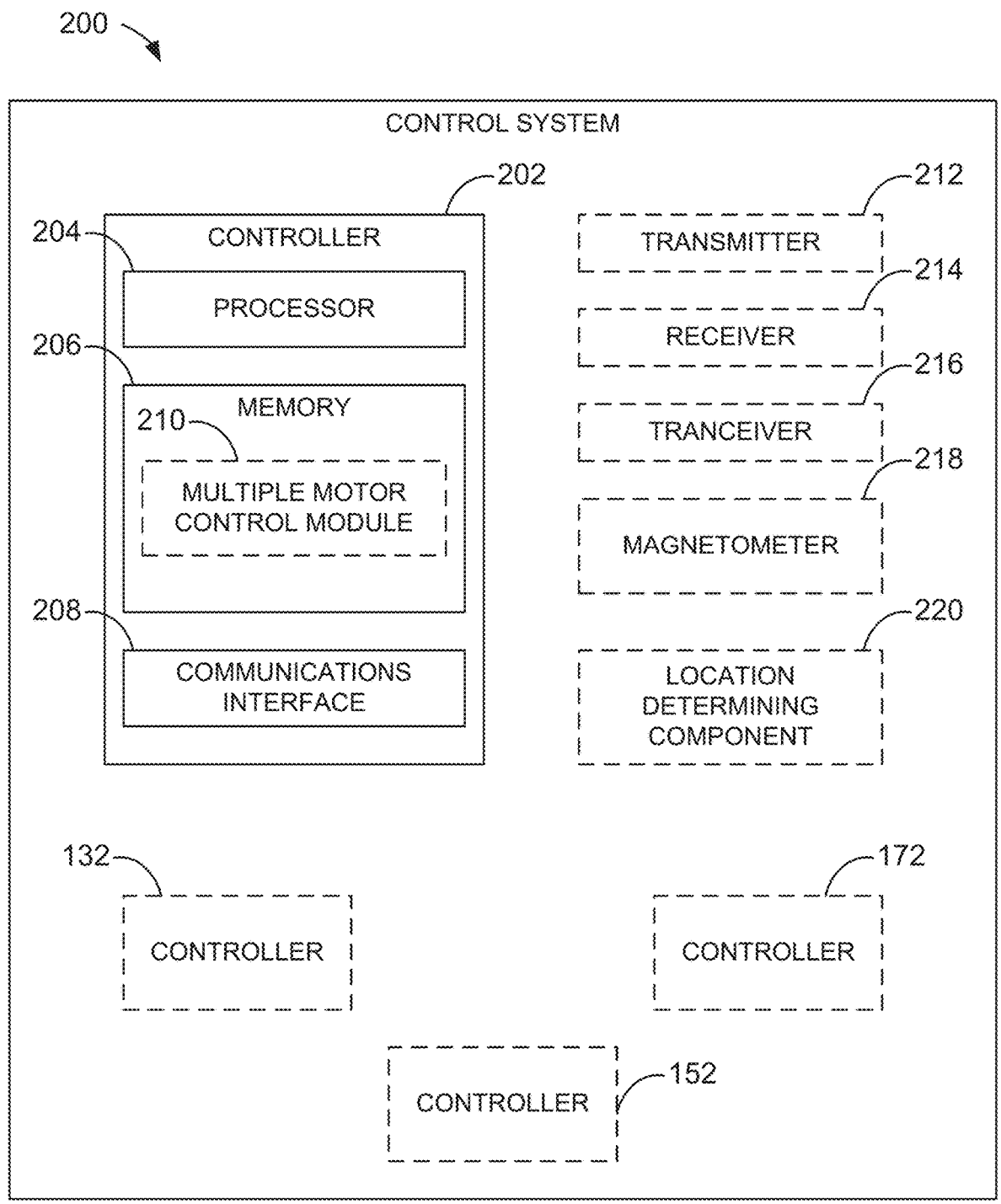
FIG. 7 is a block diagram illustrating components of a control system for navigating a marine vessel, such as the control system illustrated in any of FIGS. 5A through 5D, or a combination thereof, where the control system includes a controller of a trolling motor, propulsion motor, and/or thruster, or the control system is at least partially embedded within or attached to a trolling motor, propulsion motor, and/or thruster, in accordance with an example embodiment of the present disclosure.

In embodiments, the controller 202 is configured to generate at least one control signal for a first motor or set of motors (e.g., trolling motor(s) 120 and/or propulsion motor(s) 122) based on the position measurement and at least one control signal for a second (different) motor or set of motors (e.g., trolling motor(s) 120, propulsion motor(s) 122, and/or thruster(s) 124) based on the orientation measurement. The control system 200 can be configured to communicate the control signals to the respective motors. For example, as shown in FIGS. 6A through 6C, a trolling motor 120, propulsion motor 122, and/or thruster 124 can include components and/or circuitry for communicating with the control system 200.

In embodiments, the control system 200 is configured to generate one or more control signals and/or configured to communication data (e.g., measurements, user inputs, etc.) to a trolling motor 120. As shown in FIG. 6A, the trolling motor 120 may include or may be coupled with a receiver/transceiver 130 (or in some embodiments, a receiver and a transmitter) configured to receive the control signals and/or other communications from the control system 200. For example, the receiver/transceiver 130 can be communicatively coupled to the control system 200 via a wired or wireless connection. The trolling motor 120 may also include or may be coupled with a controller 132, which may include components and/or circuitry as described above with regard to controller 202. The controller 132 can be configured to control a steering assembly 134 (e.g., electromechanical steering assembly) and/or an actuator 136 (e.g., motor) that drives the propeller 138 of the trolling motor 120. In embodiments, the controller 132 can be configured to turn, change the rotational direction of, and/or change the rotational speed of the propeller 138 by controlling the steering assembly 134 and/or actuator 136 based on control signals received from the control system 200. In some embodiments, the controller 132 itself is configured to generate the control signals or a portion thereof based on communication data (e.g., measurements, user inputs, etc.) received from the control system 200. The trolling motor 120 may also include one or more sensors (e.g., location determining component 140, magnetometer 142, inertial sensor 144 (e.g., gyroscope 146 and/or accelerometer 148), speed sensor, a combination thereof, or the like), and the controller 132 can be configured to generate control signals at least partially based on sensory data collected by the one or more sensors and/or can be configured to communicate the sensory data to the control system 200.

In some embodiments, the control system 200 is additionally or alternatively configured to generate one or more control signals and/or configured to communication data (e.g., measurements, user inputs, etc.) to a propulsion motor 122. As shown in FIG. 6B, the propulsion motor 122 may include or may be coupled with a receiver/transceiver 150 (or in some embodiments, a receiver and a transmitter) configured to receive the control signals and/or other communications from the control system 200. For example, the receiver/transceiver 150 can be communicatively coupled to the control system 200 via a wired or wireless connection. The propulsion motor 122 may also include or may be coupled with a controller 152, which may include components and/or circuitry as described above with regard to controller 202. The controller 152 can be configured to control a steering assembly 154 (e.g., electromechanical steering assembly) and/or an actuator 156 (e.g., motor) that drives the propeller 158 of the propulsion motor 122. In embodiments, the controller 152 can be configured to turn, change the rotational direction of, and/or change the rotational speed of the propeller 158 by controlling the steering assembly 154 and/or actuator 156 based on control signals received from the control system 200. In some embodiments, the controller 152 itself is configured to generate the control signals or a portion thereof based on communication data (e.g., measurements, user inputs, etc.) received from the control system 200. The propulsion motor 122 may also include one or more sensors (e.g., location determining component 160, magnetometer 162, inertial sensor 164 (e.g., gyroscope 166 and/or accelerometer 168), speed sensor, a combination thereof, or the like), and the controller 152 can be configured to generate control signals at least partially based on sensory data collected by the one or more sensors and/or can be configured to communicate the sensory data to the control system 200.

In some embodiments, the control system 200 is further configured to generate one or more control signals and/or configured to communication data (e.g., measurements, user inputs, etc.) to a thruster 124. As shown in FIG. 6C, the thruster 124 may include or may be coupled with a receiver/transceiver 170 (or in some embodiments, a receiver and a transmitter) configured to receive the control signals and/or other communications from the control system 200. For example, the receiver/transceiver 170 can be communicatively coupled to the control system 200 via a wired or wireless connection. The thruster 124 may also include or may be coupled with a controller 172, which may include components and/or circuitry as described above with regard to controller 202. The controller 172 can be configured to control an actuator 174 (e.g., motor) that drives the propeller 176 of the thruster 124. In embodiments, the controller 172 can be configured to change the rotational direction of and/or change the rotational speed of the propeller 176 by controlling the actuator 174 based on control signals received from the control system 200. In some embodiments, the controller 172 itself is configured to generate the control signals or a portion thereof based on communication data (e.g., measurements, user inputs, etc.) received from the control system 200. The thruster 124 may also include one or more sensors (e.g., location determining component 178), and the controller 172 can be configured to generate control signals at least partially based on sensory data collected by the one or more sensors and/or can be configured to communicate the sensory data to the control system 200.

The control system 200 can be communicatively coupled to the trolling motor 120, propulsion motor 122, and/or thruster 124 as described above, or to any combination of motors on the marine vessel 100. In embodiments, the control system 200 can be communicatively coupled to multiple trolling motors 120, the trolling motor 120 and the propulsion motor 122, the trolling motor 120 and the thruster 124, the propulsion motor 122 and the thruster 124, or the trolling motor 120, the propulsion motor 122, and the thruster 124. In some embodiments, such as the embodiments shown in FIGS. 5A through 5C, the control system 200 is communicatively coupled to two or more marine vessel 100 motors (e.g., trolling motor(s) 120, propulsion motor(s) 122, and/or thruster(s) 124) via wired or wireless connections. In some embodiments, such as the embodiment shown in FIG. 7, the control system 200 is at least partially integrated within a motor. For example, at least a portion of the control system 200 can be embedded within or attached to the trolling motor 120, propulsion motor 122, and/or thruster 124. In some embodiments, the control system 200 can include controller 132, controller 152, and/or controller 172. For example, controller 132, controller 152, and/or controller 172 can be communicatively coupled to controller 202 or can replace controller 202 and perform some or all of the functions or operations described herein with regard to controller 202. In this regard, the control system 200 can be implemented as a distributed control system with controller 202, controller 132, controller 152, and/or controller 172 performing the functions or operations of the control system 200. For example, the one or more controllers can execute the multiple motor control module 210 (or modules) as one master controller, one master controller with one or more slave controllers, or as a distributed set of the controllers performing operations together, sequentially or at least partially in parallel. References herein to the control system 200 can include functions or operations performed by controller 202, controller 132, controller 152, and/or controller 172.

Figure 8A:
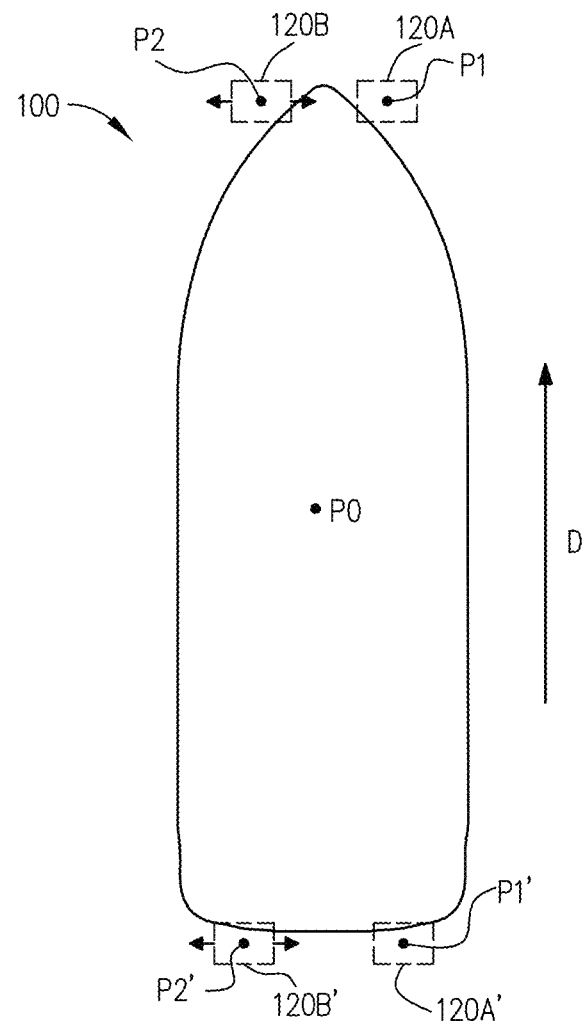
FIG. 8A is a schematic of a marine vessel navigated by at least two trolling motors in communication with a control system, such as the control system illustrated in any of FIGS. 5A through 5D, FIG. 7, or a combination thereof, in accordance with an example embodiment of the present disclosure.

In an embodiment shown in FIG. 8A, the control system 200 is configured to control at least two trolling motors 120 (e.g., trolling motor 120A and 120B, as shown in FIG. 5A) based on position and orientation measurements for the marine vessel 100. For example, the trolling motors 120A and 120B can be front-mounted, rear-mounted (e.g., trolling motor 120A' and 120B'), or at least one trolling motor (e.g., trolling motor 120A or 120B) can be front-mounted and at least one trolling motor (e.g., trolling motor 120B' or 120A') can be rear-mounted. The control system 200 is configured to receive at least one position measurement for the marine vessel 100. For example, the control system 200 can be configured to receive a position measurement P0 from the location determining component 220 of the control system 200. In some embodiments, the control system 200 is configured to receive a position measurement P1 or P1' from the trolling motor 120A or 120A' (e.g., from location determining component 140). The control system 200 is configured to generate one or more control signals for the trolling motor 120A or 120A' based on the position measurement (e.g., position measurement P0, P1, or P1'). In an embodiment, the control system 200 can be configured to cause the trolling motor 120 to actuate the marine vessel 100 in a direction and/or speed to cause a reference point (e.g., center) of the marine vessel 100 to be at a location corresponding to position measurement P0. In another embodiment, the control system 200 can be configured to cause the trolling motor 120A or 120N to actuate the marine vessel 100 (and/or the trolling motor 120A or 120A' itself) to cause the trolling motor 120A or 120A' to be at a location corresponding to position measurement P1 or P1'.

While the position P0, P1, or P1' is maintained, the marine vessel 100 may rotated or pivot about the position due to wind, water current, or other forces on the marine vessel 100. To maintain the marine vessel 100 in a fixed or substantially fixed orientation, the control system 200 is further configured to control a second trolling motor (trolling motor 120B or 120B') based on an orientation measurement for the marine vessel 100. For example, the control system 200 can be configured to cause the trolling motor 120B or 120B' to actuate the bow 104 or stern 110 of the marine vessel in a first or second direction (e.g., to the right or left) in order to control (e.g., maintain) the orientation of the marine vessel 100. The control system 200 is configured to receive at least one orientation measurement for the marine vessel 100. For example, the control system 200 can be configured to receive an orientation measurement (e.g., a heading or direction D in which the marine vessel 100 is pointed) from the magnetometer 218 of the control system 200. In some embodiments, the control system 200 is configured to receive an orientation measurement (e.g., direction D) from the trolling motor 120B or 120B' (e.g., from magnetometer 142). In other embodiments, the orientation measurement is based on at least one additional position measurement. For example, the orientation measurement can be based on a vector defined by any two of P0, P1, P2, P1', or P2', or a second position measurement P2 or P2' in addition to P1 or P1'. The control system 200 is configured to generate one or more control signals for the trolling motor 120B or 120B' based on the orientation measurement (e.g., direction D, vector coordinates, or position measurement P2 or P2'). In an embodiment, the control system 200 can be configured to cause the second trolling motor 120B or 120B' to actuate the marine vessel 100 in a first direction or a second direction (e.g., to the right or left)

to cause the vessel 100 to maintain its direction D or vector coordinates (e.g., any two of P0, P1, P2, P1', or P2'). In another embodiment, the control system 200 is configured to cause the second trolling motor 120B or 120B' to actuate the marine vessel 100 (and/or the second trolling motor 120B or 120B' itself) to cause the second trolling motor 120B or 120B' to be at a location corresponding to position measurement P2 or P2'.

Figure 8B:
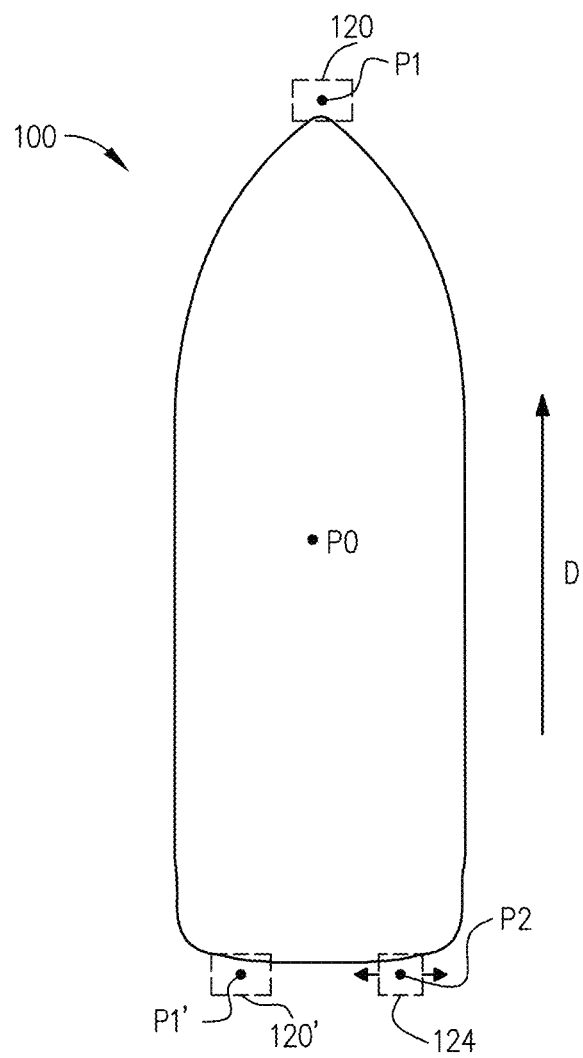
FIG. 8B is a schematic of a marine vessel navigated by at least one trolling motor and at least one thruster in communication with a control system, such as the control system illustrated in any of FIGS. 5A through 5D, FIG. 7, or a combination thereof, in accordance with an example embodiment of the present disclosure.

In an embodiment shown in FIG. 8B, the control system 200 is configured to control at least one trolling motor 120 and at least one thruster 124 (e.g., as shown in FIG. 5B) based on position and orientation measurements for the marine vessel 100. For example, the trolling motor 120 can be front-mounted, rear-mounted (e.g., trolling motor 120'), or at least one trolling motor (e.g., trolling motor 120) can be front-mounted and at least one trolling motor (e.g., trolling motor 120') can be rear-mounted. The control system 200 is configured to receive at least one position measurement for the marine vessel 100. For example, the control system 200 can be configured to receive a position measurement P0 from the location determining component 220 of the control system 200. In some embodiments, the control system 200 is configured to receive a position measurement P1 or P1' from the trolling motor 120 or 120' (e.g., from location determining component 140). The control system 200 is configured to generate one or more control signals for the trolling motor 120 or 120' based on the position measurement (e.g., position measurement P0, P1, or P1'). In an embodiment, the control system 200 can be configured to cause the trolling motor 120 and/or 120' to actuate the marine vessel 100 in a direction and/or speed to cause a reference point (e.g., center) of the marine vessel 100 to be at a location corresponding to position measurement P0. In another embodiment, the control system 200 can be configured to cause the trolling motor 120 or 120' to actuate the marine vessel 100 (and/or the trolling motor 120 or 120' itself) to cause the trolling motor 120 or 120' to be at a location corresponding to position measurement P1 or P1'. To control the orientation of the marine vessel 100 (e.g., by maintaining the marine vessel 100 in a fixed or substantially fixed orientation), the control system 200 is further configured to control the thruster 124 (e.g., a front or rear-mounted thruster) based on an orientation measurement for the marine vessel 100. For example, the control system 200 can be configured to cause the thruster 124 to actuate the bow 104 or stern 110 of the marine vessel in a first or second direction (e.g., to the right or left) in order to control (e.g., maintain) the orientation of the marine vessel 100.

The control system 200 is configured to receive at least one orientation measurement for the marine vessel 100. For example, the control system 200 can be configured to receive an orientation measurement (e.g., a heading or direction D in which the marine vessel 100 is pointed) from the magnetometer 218 of the control system 200. In some embodiments, the control system 200 is configured to receive an orientation measurement (e.g., direction D) from the trolling motor 120 or 120' (e.g., from magnetometer 142). In other embodiments, the orientation measurement is based on at least one additional position measurement. For example, the orientation measurement can be based on a vector defined by any two of P0, P1, P1', or P2, or a second position measurement P2 in addition to P1 or P1'. The control system 200 is configured to generate one or more control signals for the thruster 124 based on the orientation measurement (e.g., direction D, vector coordinates, or position measurement P2). In an embodiment, the control system 200 can be configured to cause the thruster 124 to actuate the marine vessel 100 in a first direction or a second direction (e.g., to the right or left) to cause the marine vessel 100 to maintain its direction D or vector coordinates (e.g., any two of P0, P1, P1', or P2). In another embodiment, the control system 200 is configured to cause the thruster 124 to actuate the marine vessel 100 (and/or the thruster 124 itself) to cause the thruster 124 to be at a location corresponding to position measurement P2.

Figure 8C:
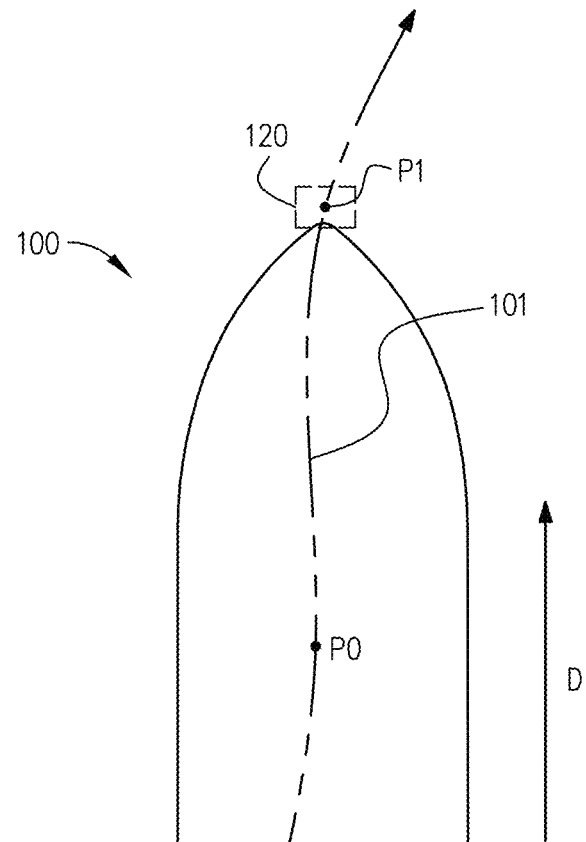
FIG. 8C is a schematic of a marine vessel navigated by at least one trolling motor and at least one propulsion motor in communication with a control system, such as the control system illustrated in any of FIGS. 5A through 5D, FIG. 7, or a combination thereof, in accordance with an example embodiment of the present disclosure.

In some implementations, a propulsion motor 122 is used to actuate the marine vessel 100 through the water, while a trolling motor 120 is primarily employed to steer the marine vessel 100 while travels through the water. For example, as shown in FIG. 8C, the marine vessel 100 can be steered along a navigation path 101 (e.g., a preselected, user-defined, and/or programmed path) through the water. The control system 200 can be configured to control at least one trolling motors 120 and at least one propulsion motor 122 (e.g., as shown in FIG. 5C) based on position and orientation measurements for the marine vessel 100 while the marine vessel 100 is navigated along path 101. The control system 200 is configured to receive at least one position measurement for the marine vessel 100. For example, the control system 200 can be configured to receive a position measurement P0 from the location determining component 220 of the control system 200. In some embodiments, the control system 200 is configured to receive a position measurement P1 or P1' from the trolling motor 120 or 120' (e.g., from location determining component 140). The control system 200 is configured to generate one or more control signals for the trolling motor 120 or 120' based on the position measurement (e.g., position measurement P0, P1, or P1'). In an embodiment, the control system 200 can be configured to cause the trolling motor 120 and/or 120' to actuate the marine vessel 100 in a direction and/or speed to cause a reference point (e.g., center) of the marine vessel 100 to be at a location corresponding to a position along path 101 that is subsequent to the measured position P0. In another embodiment, the control system 200 can be configured to cause the trolling motor 120 or 120' to actuate the marine vessel 100 (and/or the trolling motor 120 or 120' itself) to cause the trolling motor 120 or 120' to be at a location corresponding to a position along path 101 that is subsequent to the measured position P1 or P1'.

To control the orientation of the marine vessel 100 (e.g., by maintaining the marine vessel 100 in a fixed or substantially fixed orientation), the control system 200 is further configured to control the propulsion motor 122 based on an orientation measurement for the marine vessel 100. For example, the control system 200 can be configured to cause the propulsion motor 122 to steer the stern 110 of the marine vessel 100 in a first or second direction (e.g., to the right or left) in order to control (e.g., maintain) the orientation of the marine vessel 100. The control system 200 is configured to receive at least one orientation measurement for the marine vessel 100. For example, the control system 200 can be configured to receive an orientation measurement (e.g., a heading or direction D in which the marine vessel 100 is pointed) from the magnetometer 218 of the control system 200. In some embodiments, the control system 200 is configured to receive an orientation measurement (e.g., direction D) from the trolling motor 120 or 120' (e.g., from magnetometer 142), or from the propulsion motor 122 (e.g., from magnetometer 168). In other embodiments, the orientation measurement is based on at least one additional position measurement. For example, the orientation measurement can be based on a vector defined by any two of P0, P1, P1', or P2, or a second position measurement P2 in addition to P1 or P1'. The control system 200 is configured to generate one or more control signals for the propulsion motor 122 based on the orientation measurement (e.g., direction D, vector coordinates, or position measurement P2). In an embodiment, the control system 200 can be configured to cause the propulsion motor 122 to steer the marine vessel 100 in a first direction or a second direction (e.g., to the right or left) to cause the marine vessel 100 to maintain its direction D or vector coordinates (e.g., any two of P0, P1, P1', or P2). In another embodiment, the control system 200 is configured to cause the propulsion motor 122 to actuate the marine vessel 100 (and/or the propulsion motor 122 itself) to cause the propulsion motor 122 to be at a location corresponding to a position along path 101 that is subsequent to the measured position P2 of the propulsion motor 122.

In some embodiments, the control system 200 is further configured to control the first motor or set of motors (e.g., trolling motor(s) 120 and/or propulsion motor(s) 122) based on the position measurement and the second (different) motor or set of motors (e.g., trolling motor(s) 120, propulsion motor(s) 122, and/or thruster(s) 124) based on the orientation measurement by generating one or more control signals based on a current speed and/or direction of the marine vessel 100. For example, the control system 200 can be configured to generate one or more control signals that cause the first motor(s) or the second motor(s) to ramp up to an operating speed and direction slowly (e.g., by gradually increasing the motor speed and/or gradually adjusting the steering) in order to avoid jerking of the marine vessel 100 (e.g., to avoid passengers losing balance, etc.). In an embodiment, the control system 200 is configured to receive one or more inertial measurements (e.g., from inertial sensor 144 or 164), and is further configured to generate the one or more control signals for the first motor(s) and/or second motor(s) based on the inertial measurements. For example, the control system 200 can be configured to generate one or more control signals that cause the first motor(s) and/or second motor(s) to actuate the marine vessel 100 without exceeding a predefined/preselected maximum acceleration (e.g., a maximum g-force).

The foregoing embodiments are provided as examples, and it is to be understood that, as described herein, the control system 200 can be configured to operate with at least two motors, and in some embodiments, the control system 200 can be configured to operate with three or more motors under the same or similar principles. In some embodiments, the control system 200 and two trolling motors 120 can be a system, or the control system 200, at least one trolling motor 120 and at least one thruster 124 can be a system, or at least one trolling motor 120 and at least one propulsion motor 122 can be a system, or at least one propulsion motor 122 (e.g., operating as a trolling motor 120) and at least one thruster 124 can be a system, or at least one trolling motor 122, at least one propulsion motor 120, and at least one thruster 124 can be a system, or any other combination of two or more motors that can actuate at least two reference points on a marine vessel independently.

Figure 9D:
FIG. 9D is a perspective view of a display for a marine vessel display system, such as the marine vessel display system illustrated in FIG. 9A and/or FIG. 9B, in accordance with an example embodiment of the present disclosure.
Figure 9C:
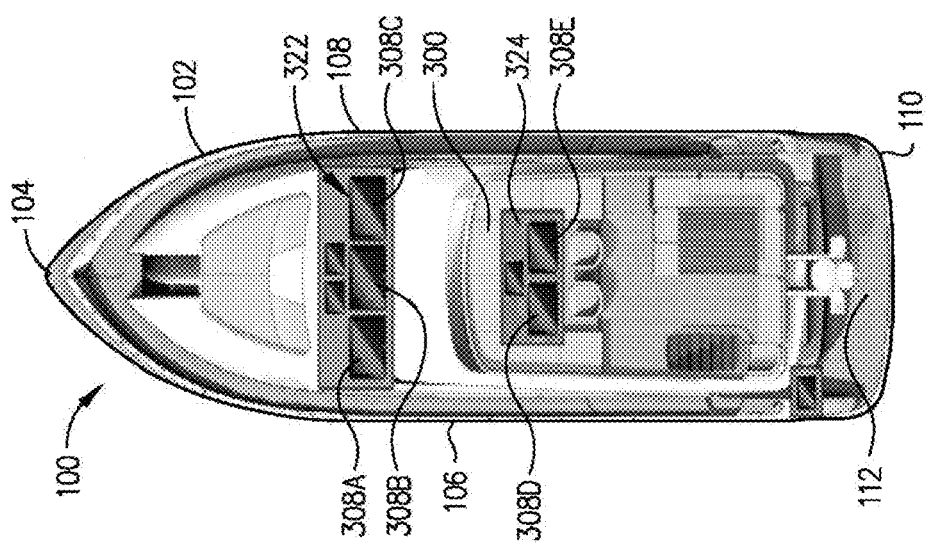
FIG. 9C is a top view of a marine vessel that can employ a marine vessel display system, such as the marine vessel display system illustrated in FIG. 9A and/or FIG. 9B, in accordance with an example embodiment of the present disclosure.

As shown in FIGS. 9A through 9D, the control system 200 may also be configured to communication with a marine vessel display system 300. For example, the control system 200 can be communicatively coupled (e.g., wired or wirelessly connected) to the marine vessel display system 300, or included within the marine vessel display system 300 (e.g., as a component of the marine vessel display system 300. The marine vessel display system 300 may be mounted in a marine vessel 100 (e.g., boat, ship, sailboat, or other watercraft), as shown in FIG. 9C. The marine vessel display system 300 may assist operators of the marine vessel 300 in monitoring information related to the operation of the marine vessel 300. As utilized herein, the term operator may mean any user of the marine vessel display system 300. For example, an operator may be an owner of the marine vessel 300, a crew member, a pilot, a passenger, and so forth.

As shown in FIGS. 9A and 9B, the marine vessel display system 300 can include at least one input 314 for receiving data from one or more marine input sources 316; a display 308 for presenting information representative of at least some of the data from the marine input sources 316; and a processing system 302 in communication with the inputs 314 and the display 308. As described in more detail below, the processing system 302 may implement a plurality of modes of operation, each of which may cause the display 308 to present information representative of data from predetermined ones of the marine input sources 316 and in selected formats. The marine vessel display system 300 may further comprise a position-determining component 312 that furnishes geographic position data for the marine vessel 300. The processing system 302 may implement a mode selector 304 configured to select between a plurality of modes of operation, respective ones of which present information representative of data from selected marine input sources 316 on the display 308. The processing system 302 may further be configured to cause at least one of automatic activation or deactivation of an equipment of the marine vessel (e.g., turn on a fish finder, start a trolling motor, activate an anchor system, start or shut down the engines of the marine vessel, activate a navigation system, etc.) during selection of a particular mode of operation. In an embodiment, the processing system 302 is coupled to and/or includes the control system 200 that is configured to control the two or more motors (e.g., trolling motor(s) 120, propulsion motor(s) 122, and/or thruster(s) 124) of the marine vessel 100.

The input 314 may be any wireless or wired device or devices for receiving data from the marine input sources 316 and transferring the data to the processing system 302. The input 314 may comprise, for example, one or more Ethernet ports, Universal Serial Bus (USB) Ports, High Definition Multi-Media Interface (HDMI) ports, memory card slots, video ports, radio frequency (RF) receivers, infrared (IR) receivers, Wi-Fi receivers, Bluetooth devices, and so forth.

The marine input sources 316 may provide data to the processing system 302 and may comprise any measurement devices, sensors, receivers, or other components that sense, measure, or otherwise monitor components of the marine vessel 300 or its surroundings. For example, the marine input sources 316 may include sensors that measure or sense vessel fuel level, wind speed, wind direction, vessel temperature, ambient temperature, water current speed, rudder position, an azimuth thruster position, water depth, boat water storage level, anchor status, boat speed, combinations thereof, and the like. In an embodiment (e.g., as shown in FIG. 9C), a marine input source 316 includes an integrated or external sonar sounder including a sonar transducer. In some embodiments, the marine input sources 316 can also include an integrated or external radar scanner or other proximity sensor.

The marine input sources 316 may also include transmitters, receivers, transceivers, and other devices that receive data from external sources. For example, the marine input sources 316 may include an integrated or external weather receiver for receiving weather data from a weather source, a satellite entertainment system receiver for receiving entertainment content broadcast via satellite, and/or a global positioning system (GPS) receiver or other satellite navigation receiver for receiving navigation signals.

The marine input sources 316 may also comprise a receiver or other device for communicating with transmitters or other devices worn by crew and/or passengers (hereinafter "wearable transmitter") on the marine vessel 300. For example, crew and passengers of the marine vessel 300 may be provided with a wearable transmitter configured to warn of "man overboard" emergencies. Such a wearable transmitter may detect when the wearer is no longer on the marine vessel 300, for example, by sensing the presence of water or by comparing the current geographic position of the wearer to the current geographic position of the marine vessel 300, and may thereafter provide a transmission to cause the marine vessel display system 300 to enter a man overboard mode of operation and to aid in the recovery of the wearer (e.g., by providing the GPS position of the wearer, a locating beacon, or the like). Similarly, crew and passengers of the marine vessel 300 may be provided with a wearable transmitter that is configured to provide a transmission when the wearable transmitter, or an associated medical monitoring device, detects that the wearer is experiencing a medical emergency or health issue. The transmission may cause the marine vessel display system 300 to initiate an automated communication requesting assistance (e.g., an S.O.S. radio transmission), initiate an autopilot mode of operation, or the like. Still further, crew and passengers of the marine vessel 300 may be provided with a wearable transmitter that is configured to provide radio communication between the wearer and an operator of the marine vessel display system 300. In embodiments, a wearable transmitter may be provided that is capable of furnishing multiple functions such as those described herein above.

The marine input sources 316 may also comprise a security system for monitoring, ports, doors, windows, and other parts of the marine vessel 300 against unauthorized access and one or more cameras for providing video and/or other images of the marine vessel 300 and/or surroundings of the marine vessel 300.

The marine input sources 316 may comprise one or more computers (e.g., control system 200) that may be used to transfer data to the marine vessel display system 300. The marine input sources 316 may be integrally formed with the marine vessel display system 300, may be stand-alone devices, or may be a combination of both. For example, a sonar sounder may be integrated into the marine vessel display system 300 or may be an external sonar sounder module. Similarly, a radar scanner may be integrated into the marine vessel display system 300 or be an external device. The marine input sources 316 may be operated and/or adjusted using controls on the marine vessel display system 300 or may have their own controls.

The display 308 may be communicatively coupled with the processing system 302 and may be configured for displaying text, data, graphics, images and other information representative of data from the marine input sources 316 and/or other sources. An example embodiment of the display 308 is shown in FIG. 9D. The display 308 may be a liquid crystal display (LCD), light-emitting diode (LED) display, light-emitting polymer (LEP) display, thin film transistor (TFT) display, gas plasma display, or any other type of display. The display 308 may be backlit such that it may be viewed in the dark or other low-light environments. The display 308 may be of any size and/or aspect ratio, and in one or more embodiments, may be 15 inches, 17 inches, 19 inches, or 24 inches (measured diagonally). In some embodiments, the display 308 may include a touchscreen display 310. The touchscreen display 310 may employ any touchscreen technology, including, but not limited to, resistive, capacitive, or infrared touchscreen technologies, or any combination thereof.

The processing system 302 may control the presentation of information on the display 308, may perform other functions described herein, and can be implemented in hardware, software, firmware, or a combination thereof. The processing system 302 may include any number of processors, controllers, microprocessors, microcontrollers, programmable logic controllers (PLCs), field-programmable gate arrays (FPGAs), application specific integrated circuits (ASICs), or any other component or components that are operable to perform, or assist in the performance of, the operations described herein.

The processing system 302 may also be communicatively coupled to or include memory 306 for storing instructions or data. The memory 306 may be a single component or may be a combination of components that provide the requisite storage functionality. The memory 306 may include various types of volatile or non-volatile memory such as flash memory, optical discs, magnetic storage devices, SRAM, DRAM, or other memory devices capable of storing data and instructions. The memory 306 may communicate directly with the processing system 302, or may communicate over a data bus or other mechanism that facilitates direct or indirect communication. The memory 306 may optionally be structured with a file system to provide organized access to data existing thereon.

The memory 306 may store one or more databases that may include information about the marine vessel 300 in which the marine vessel display system 300 is used, such as the length, width, weight, turning radius, top speed, draft, minimum depth clearance, minimum height clearance, water capacity, fuel capacity and/or fuel consumption rate of the marine vessel 300. The databases may also store information related to the locations and types of navigational aids including buoys, markers, lights, or the like. In some embodiments, the information related to navigational aids may be provided by the Coast Guard or other map data sources.

The processing system 302 may implement one or more computer programs that provide the modes of operation described below, that control the display of information on the display 308 as described herein, and/or that cause automatic activation or deactivation of an equipment of the marine vessel during selection of the first mode of operation. The computer programs may comprise ordered listings of executable instructions for implementing logical functions in the processing system 302. The computer programs can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can contain, store, communicate, propagate or transport the program for use by or in connection with the processing system 302 or other instruction execution system, apparatus, or device. The computer-readable medium can be, for example, but not limited to, an electronic, magnetic, optical, electro-magnetic, infrared, or semi-conductor system, apparatus, device, or propagation medium. More specifically, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

In accordance with the present disclosure, the processing system 302 may implement a plurality of modes of operation, each of which may present information representative of data from selected marine input sources 316 via the display 308. In some embodiments, the information may be presented in a desired format to minimize confusion and increase ease of use. For example, the processing system 302 may implement a pre-trip planning mode in which information representative of trip planning data is presented on the display 308. The trip planning data may be uploaded, transmitted, or otherwise communicated to the marine vessel display system 300 from one or more marine input sources 316 and may include route planning data; waypoint data; journey plans; forecasted wind, current, storm, and/or tidal conditions; vessel fuel requirements; vessel water requirements; and other data that may be useful to an operator while planning a journey. The pre-trip planning mode may permit an operator to create a journey plan or similar plan on a remote or local computer and then transfer information related to the plan to the marine vessel display system 300 so it can be presented on the display 308 and accessed by the operator while operating the marine vessel 300.

The processing system 302 may also implement a boat preparation mode in which information representative of water storage data, fuel level data, hatch status data and/or other boat readiness data is presented on the display 308. The boat preparation mode may provide information related to a boat's readiness for use.

The processing system 302 may also implement a close quarters mode in which information representative of proximity data and navigation data is presented on the display 308. The close quarters mode may be particularly useful when navigating in a harbor or other confined area when an operator needs to be aware of his or her vessel's location relative to other vessels and obstacles. The close quarters mode may also present information from a pilot book, local speed limits, rules, regulations, and so forth, on the display 308.

The processing system 302 may also implement a docking/undocking mode in which information representative of proximity data from a proximity sensor, wind data from a wind sensor, water current data from a current sensor, rudder position data from a rudder position sensor, and/or azimuth thruster position data from an azimuth thruster position sensor is presented on the display 308. The docking/undocking mode permits an operator to view representations of obstacles such as stationary boats, docks, and other hazards while simultaneously monitoring wind conditions, current conditions, and the status of components on the vessel while docking or undocking the vessel.

The processing system 302 may also implement a main transit mode in which information representative of fuel level data, navigation data, water depth data, and/or weather data is presented on the display 308. A feature of the main transit mode may be monitoring the progress of the marine vessel 300 against a journey plan. For example, the processing system 302 may compare information related to a desired path of transit with the current position of the marine vessel 300 received from the position-determining component 312 while the marine vessel 300 is in transit to determine if the marine vessel 300 is off course, has enough fuel to reach its intended destination, and so forth, and may then display such information on the display 308. The main transit mode may also present information representative of nearby vessels, obstacles, and so forth.

The processing system 302 may also implement an anchoring mode in which information representative of the anchor status data, wind data, depth data, tide data, proximity data, and/or navigation is presented on the display 308. The anchoring mode may permit an operator to find suitable locations to anchor the marine vessel 300, and alert the operator if the anchor is dragging and/or if the marine vessel 300 is moving when it should not be.

The processing system 302 may also implement an off-boat monitoring mode in which information representative of security data, anchor status data, wind data, and/or weather data is presented on the display 308. In some embodiments, the marine vessel display system 300 may send texts, images, and so forth, to a remote device, such as an operator's mobile telephone or a computer, via a cellular telephone connection, radio frequency transmitter, the Internet, and so forth, so that the operator may monitor the marine vessel 300 remotely.

The processing system 302 may also implement a fishing mode in which information representative of fish finder data, water temperature data, navigation data, and/or proximity data is presented on the display 308. The fishing mode may allow an operator to view representations of fish, other boats, and hazards while fishing and to monitor water conditions to determine if they are conducive to fishing.

The processing system 302 may also implement a boat storage and transport mode in which information representative of photographic data, navigation data, and/or proximity data is presented on the display 308. As with the off-boat monitoring mode, the processing system 302 may display such information on the display 308 and/or transmit it to a remote device.

The processing system 302 may also implement a man overboard mode in which information representative of passenger location data and/or navigation data is presented on the display 308. The man overboard mode may display an alert and/or sound an alarm when any of the location devices worn by passengers indicate that a passenger is outside of a threshold distance from the marine vessel 300 and may have fallen overboard. The man overboard mode may also record and display the last known coordinates for the passenger when he or she left the marine vessel 300 and may automatically send such data to a marine rescue authority such as the United States Coast Guard or the like.

The processing system 302 may also implement a hazard hit mode in which information representative of bilge water level data is presented on the display 308. The hazard hit mode may allow an operator to quickly determine if the marine vessel 300 is taking on water and, if so, the rate at which the marine vessel 300 is taking on water. The hazard hit mode may also determine if a bilge pump can remove the water quickly enough to keep the marine vessel 300 afloat or if the marine vessel 300 should be abandoned. The hazard hit mode may also alert authorities such as the United States Coast Guard, or the like, of the position and status of the marine vessel 300.

The above-described modes of operation are only examples of modes that may be implemented by the processing system 302. Other modes of operation, or combinations or portions of the above-described modes, may also be implemented without departing from the scope of the invention.

In addition to displaying information from one or more selected marine input sources 316, each mode of operation may present information in a particular operator-selected or otherwise predetermined format. For example, some of the information may be presented in the form of one or more virtual devices that mimic the appearance and/or function of a gauge, instrument, or other analog device. Each virtual device may have a unique collection of graphical and functional properties that may be configured by a layout designer and/or adjusted by an operator. Examples of virtual devices that may be presented with the marine vessel display system 300 include a chartplotter, a radar screen, a fishfinder, a camera/video screen, digital instruments with numbers, analog instrument gauges, autopilot interfaces, and entertainment interfaces. In some embodiments, the display format may change based on a current operating mode. For example, if the selected mode of operation from a first mode of operation, such as a main transit mode of operation, to a second mode of operation, such as a docking/undocking, anchoring, or fishing mode of operation or other modes of operation, the display format may change accordingly to accommodate features relevant to the selected mode of operation.

The processing system 302 may further be configured to cause automatic activation or deactivation of various equipment of the marine vessel during selection of particular modes of operation. In embodiments, equipment of the marine vessel 300 for which use may be expected or possible during the time a mode of operation is selected may be associated with that mode of operation. The processing system 302 may then automatically activate such equipment when the mode of operation is selected. Similarly, the processing system 302 may automatically deactivate other equipment that is no longer expected to be used while the mode of operation is selected. For example, when a fishing mode is selected the processing system 302, the processing system 302 may issue a command to shut down or idle the marine vessel's engine, start a trolling motor, and/or turn on a fish finder. Similarly, when a hazard hit mode is initiated, the processing system 302 may automatically cause a bilge pump to be turned on, and/or may automatically tune a marine radio to alert authorities such as the United States Coast Guard, or the like, of the position and status of the marine vessel 300 (e.g., transmit an S.O.S. call). In embodiments, the processing system 302 may be configured to cause the automatic activation or deactivation of one or more output devices 320 via an output 318 when a particular mode of operation is selected, as described below.

The position-determining component 312 may be configured to provide location-determining functionality for the marine vessel display system 300 and, optionally, the marine input sources 316 and/or other system and components employed by the marine vessel 300. Location-determining functionality, for purposes of the following discussion, may relate to a variety of different navigation techniques and other techniques that may be supported by "knowing" one or more locations. For instance, location-determining functionality may be employed to provide location data, timing data, speed data, and/or a variety of other navigation-related data.

In implementations, the position-determining component 312 may comprise a receiver that is configured to receive signals from one or more position-transmitting sources. For example, the position-determining component 312 may be configured for use with a Global Navigation Satellite system (GNSS). In embodiments, the position-determining component 312 may be a global positioning system (GPS) receiver operable to receive navigational signals from GPS satellites and to calculate a location of the marine vessel 300 as a function of the signals.

While a GPS system is described herein, it is contemplated that a wide variety of other positioning systems may also be used, such as terrestrial based systems (e.g., wireless-telephony systems or data systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros or odometers), and so on. Other example systems include, but are not limited to, a Global Orbiting Navigation Satellite System (GLONASS), a Galileo navigation system, or other satellite navigation system.

The output 318 may be any wired or wireless port, transceiver, memory slot, or other device for transferring data or other information from the processing system 302 to the output devices 320. The output devices 320 may be any devices capable of receiving information from the processing system 302 or being controlled by the marine vessel display system 300 such as a marine radio, beacon, lighting system, and so forth. In embodiments, the processing system 302 may be configured to cause at least one of automatic activation or deactivation of the output devices 320 via the output 318. For example, the processing system 302 may automatically tune a channel on a marine radio, activate or deactivate a beacon, turn a lighting system on or off, or the like, during selection of various modes of operation.

The marine vessel display system 300 may also include a speaker for providing audible instructions and feedback, a microphone for receiving voice commands, an infrared port for wirelessly receiving and transmitting data and other information from and to nearby electronics, and other information, and a cellular or other radio transceiver for wirelessly receiving and transmitting data from and to remote devices.

In addition to the input 314 and output 318, the marine vessel display system 300 may also include a number of other Input/Output (I/O) ports that permit data and other information to be communicated to and from the processing system 302. The I/O ports may include one or more removable memory card slots, such as a micro SD card slot, or the like for receiving removable memory cards, such as microSD cards, or the like, and/or an Ethernet port for coupling a processing system 302 to another processing system such as a personal computer. Databases of geographic areas cross-referenced with modes of operation, navigational software, cartographic maps and other data and information may be loaded in the marine vessel display system 300 via the I/O ports, the wireless transceivers, or the infrared port mentioned above. The data may be stored in memory 306 of processing system 302. In some embodiments, stored cartographic maps may be upgraded, downgraded, or otherwise modified in the background without interfering with the primary uses of the marine vessel display system 300. If multiple processing systems 302 are employed by the marine vessel display system 300, the upgrade, downgrade, or modification may be applied to all processing systems 202. Thus, for example, the various components of the marine vessel display system 300 may be easily upgraded, downgraded, or modified without manually and tediously installing the same data on each of the components. Such functionality may also facilitate data uniformity among the various components of the marine vessel display system 300.

The marine vessel display system 300 may further include at least one housing that encloses and protects the other components of the marine vessel display system 300 from the environment (e.g., moisture, contaminants, vibration, impact, etc.). The housing may include mounting hardware for removably securing the marine vessel display system 300 to a surface within the marine vessel 100 or may be configured to be panel-mounted within the marine vessel 100. The housing may be constructed from a suitable lightweight and impact-resistant material such as, for example, plastic, nylon, aluminums, composites, steels, or any combination thereof. The housing may include appropriate gaskets or seals to make it substantially waterproof or water resistant. The housing may take any suitable shape or size, and the particular size, weight and configuration of the housing may be changed without departing from the scope of the present disclosure.

FIG. 9B illustrates an embodiment of the marine vessel display system 300, where the marine vessel display system 300 employs a plurality of independent displays (e.g., displays 308A through 308E). Two or more of the displays (e.g., displays 308A through 308E) may be mounted proximate (e.g., adjacent) to one another to form one or more display stations in the marine vessel 300. For example, as illustrated in FIGS. 9B and 9C, three displays 308A, 308B, 308C may be mounted together to form a first display station 322 in a first area of the marine vessel 100, and two other displays 308D, 308E may be mounted together to form a second display station 324 in a second area of the marine vessel 300. The marine vessel display system 300 may also include additional displays 308 grouped into one or more additional display stations. The embodiments described herein and shown in the figures are example implementations of the technology; however, it is contemplated that any number of displays and/or display stations can be employed by the marine vessel display system 300 without departing from the scope of this disclosure. Furthermore, the processing system 302 may be any configuration of processors that enables communication with one or more displays (e.g., displays 308A through 308E). In some embodiments, each display 308 and/or display station 322 or 324 may have a separate processing system 302, or one processing system 302 may control all displays 308 of both display stations 322 and 324 and any other display stations, or any combination thereof (e.g., some displays 308 have respective separate processing systems 302 and some displays 308 have shared processing systems 302). In embodiments including multiple processing systems 302 for respective displays 308 and/or display stations 322 or 324, the processing systems 302 may coordinate their activities with other processing systems 302 of the marine vessel display system 300. The processing system 302 may include any number of processors, micro-controllers, or other processing systems and resident or external memory for storing data and other information accessed or generated by the marine vessel display system 300.

Figure 10:
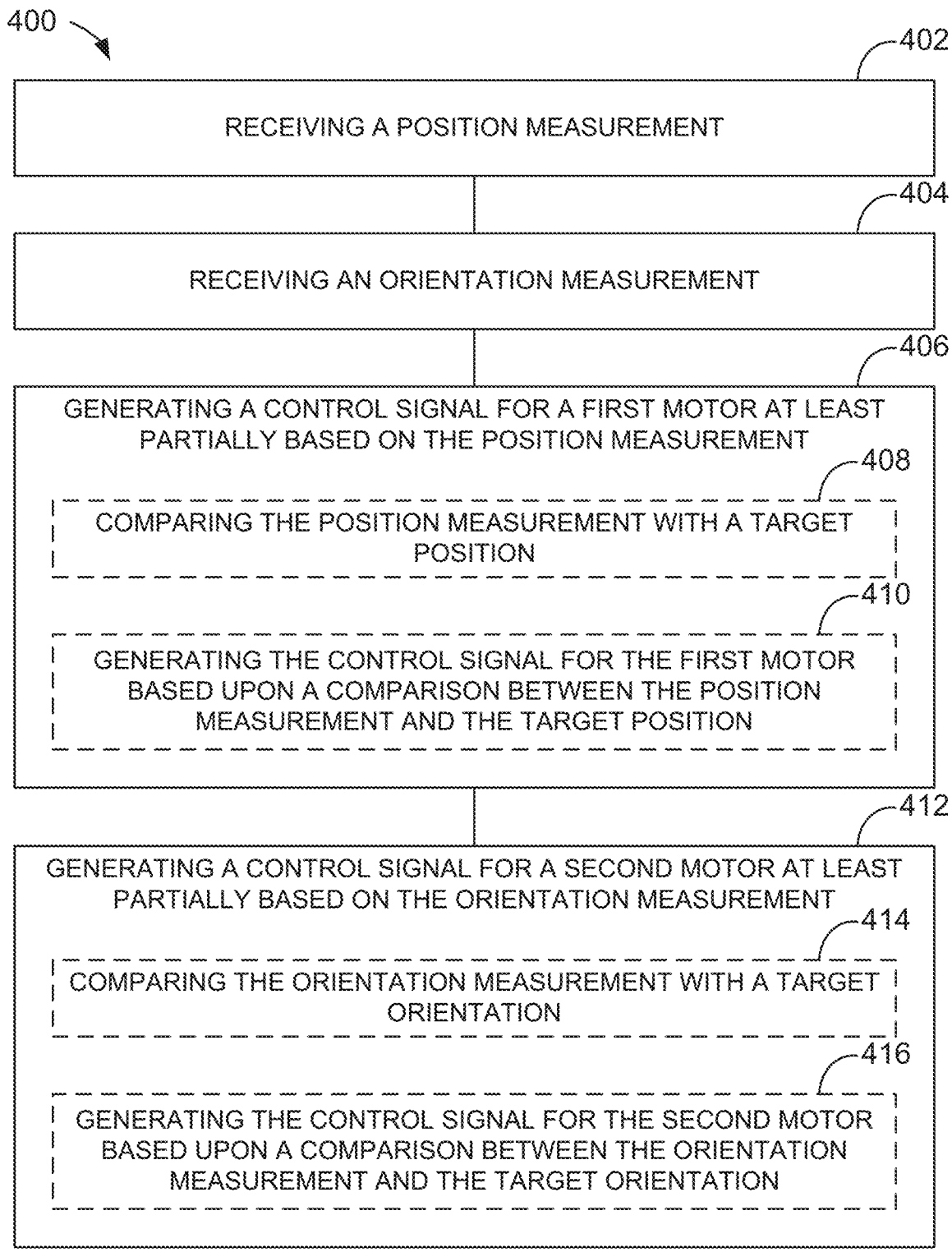
FIG. 10 is a flow diagram illustrating a process for navigating a marine vessel, such as the marine vessel illustrated in any of FIGS. 1 through 4B or FIGS. 8A through 8C, or a combination thereof, by employing a multiple motor control system, such as the control system illustrated in any of FIGS. 5A through 5D, FIG. 7, or a combination thereof, in accordance with an example implementation of the present disclosure.

FIG. 10 illustrates an example process 400 that employs a control system 200 for navigating a marine vessel (e.g., marine vessel 100) through the water. In general, operations of disclosed processes (e.g., process 400) may be performed in an arbitrary order, unless otherwise provided in the claims. The control system 200 can be communicatively coupled to two or motors of a marine vessel. For example, in an implementation, the control system 200 is communicatively coupled to (and/or at least partially embedded within) two trolling motors 120, at least one trolling motor 120 and at least one thruster 124, at least one trolling motor 120 and at least one propulsion motor 122, or any two motors (e.g., trolling motor(s) 120, propulsion motor(s) 122, and/or thruster(s) 124) that can be used actuate and/or steer the marine vessel 100.

In an implementation of the process 400, the control system 200 receives a position measurement for the marine vessel (block 402) and also receives an orientation measurement for the marine vessel (block 404). For example, the control system 200 can be configured to receive a position measurement P0 from the location determining component 220 of the control system 200. In some implementations, the control system 200 is configured to receive a position measurement from at least one motor (e.g., the first motor). For example, the control system 200 can be configured to receive position P1 or P1' from the trolling motor 120A or 120A' (e.g., from location determining component 140). The control system 200 can be configured to receive an orientation measurement (e.g., a heading or direction D in which the marine vessel 100 is pointed) from the magnetometer 218 of the control system 200. In some implementations, the control system 200 is configured to receive an orientation measurement (e.g., direction D) from at least one motor (e.g., the first and/or second motor). For example, the control system can be configured to receive the orientation measurement (e.g., direction D) from a trolling motor 120 (e.g., from magnetometer 142) or a propulsion motor (e.g., from magnetometer 162). In other embodiments, the orientation measurement is based on at least one additional position measurement. For example, with reference to FIGS. 8A through 8C, the orientation measurement can be based on a vector defined by any two of P0, P1, P2, P1', or P2', or a second position measurement P2 or P2' in addition to P1 or P1'.

The control system 200 generates a control signal for a first motor at least partially based on the position measurement (block 406). For example, the control system 200 can be configured to generate one or more control signals for the trolling motor 120A or 120N (or propulsion motor 122) based on the position measurement (e.g., position measurement P0, P1, or P1'). In some implementations, the control system 200 compares the position measurement with a target position (block 408) and then generates the control signal (or signals) for the first motor based upon the comparison between the position measurement and the target position (block 410). For example, in an implementation, the control system 200 can be configured to cause the trolling motor 120 (or propulsion motor 122) to actuate the marine vessel 100 in a direction and/or speed to cause a reference point (e.g., center) of the marine vessel 100 to be at a location corresponding to position measurement P0. In another example implementation, the control system 200 can be configured to cause the trolling motor 120A or 120N to actuate the marine vessel 100 (and/or the trolling motor 120A or 120A' itself) to cause the trolling motor 120A or 120A' to be at a location corresponding to position measurement P1 or P1'.

To control the orientation of the marine vessel, the control system 200 controls at least one second motor (trolling motor 120B or 120B', propulsion motor 122, and/or thruster 124) based on an orientation measurement for the marine vessel 100 (block 412). For example, the control system 200 can be configured to cause the trolling motor 120B or 120B', propulsion motor 122, and/or thruster 124 to actuate the bow 104 or stern 110 of the marine vessel in a first or second direction (e.g., to the right or left) in order to control (e.g., maintain or adjust) the orientation of the marine vessel 100. In some implementations, the control system 200 compares the orientation measurement with a target orientation (block 414) and then generates the control signal (or signals) for the second motor based upon the comparison between the orientation measurement and the target orientation (block 416). For example, in an implementation, the control system 200 can be configured to cause the second motor (e.g., trolling motor 120B or 120B', propulsion motor 122, and/or thruster 124) to actuate the marine vessel 100 in a first direction or a second direction (e.g., to the right or left) to cause the marine vessel 100 to maintain its direction D or vector coordinates (e.g., any two of P0, P1, P2, P1', or P2') when the target orientation is the same or substantially the same as the measured orientation, or to cause the marine vessel 100 to be rotated to a new pointing direction or new vector coordinates when the target orientation is different from the measured orientation. In another example implementation, the control system 200 is configured to cause the second motor to actuate the marine vessel 100 (and/or the second motor itself) to cause the second motor to be at a location corresponding to position measurement P2 or P2' when the target orientation is the same or substantially the same as the measured orientation, or to a location corresponding to a new position (e.g., the target position) when the target orientation is different from the measured orientation (e.g., when the measured position P2 or P2' for the second motor is different from the target position for the second motor).

Although the technology has been described with reference to the embodiments illustrated in the attached drawing figures, equivalents may be employed and substitutions made herein without departing from the scope of the technology as recited in the claims. For example, the components described herein need not be physically connected to one another since wireless communication among the various depicted components is permissible and intended to fall within the scope of the present invention. Components illustrated and described herein are merely examples of a device and components that may be used to implement the embodiments of the present invention and may be replaced with other devices and components without departing from the scope of the invention.

Having thus described various embodiments of the technology, what is claimed as new and desired to be protected by Letters Patent includes the following:

1. A system for navigating a marine vessel having a bow and a stern, the system comprising:
   a first motor configured to couple to the bow of the marine vessel, the first motor including a first location determining component and a first heading sensor configured to generate position and heading information for the first motor;
   a second motor configured to couple to the stern of the marine vessel, the second motor including a second location determining component and a second heading sensor configured to generate position and heading information for the second motor;
   a third motor configured to couple to the stern of the marine vessel; and
   a control system in communication with the motors, the control system configured to:
      receive the position and heading information for the first motor and the second motor,
      receive a position and an orientation measurement corresponding to the marine vessel, and
      generate control signals for the first, second, and third motors based on the received position and orientation measurements of the marine vessel and the position and heading information for the first motor and the second motor.

2. The system of claim 1, wherein the control system comprises at least one controller integrated with at least one of the motors.

3. The system of claim 1, wherein the control system is configured to generate the control signals by comparing the position measurement of the marine vessel with a target position.

4. The system of claim 1, wherein the control signal is configured to generate the control signals by comparing the orientation measurement with a target orientation.

5. The system of claim 1, further including a third location determining component operable to determine the position of the marine vessel.

6. The system of claim 1, further including a magnetometer operable to determine the orientation of the marine vessel.

7. The system of claim 6, wherein the magnetometer is integrated with at least one of the motors.

8. The system of claim 1, wherein each of the motors comprise a trolling motor.

9. The system of claim 1, wherein the motors are selected from the group consisting of a trolling motor and a thruster.

10. The system of claim 1, wherein the second motor is configured to be positioned on a port section of the stern of the marine vessel.

11. The system of claim 1, wherein the third motor is configured to be positioned on a starboard section of the stern of the marine vessel.

12. A system for navigating a marine vessel having a bow and a stern, the system comprising:
   a first trolling motor configured to couple to the bow of the marine vessel, the first trolling motor including a first location determining component and a first heading sensor configured to generate position and heading information for the first trolling motor;
   a second trolling motor configured to couple to a port section of the stern of the marine vessel, the second trolling motor including a second location determining component and a second heading sensor configured to generate position and heading information for the second trolling motor;
   a third trolling motor configured to couple to a starboard portion of the stern of the marine vessel, the third trolling motor including a third location determining component and a third heading sensor configured to generate position and heading information for the third trolling motor; and
   a control system in communication with the motors, the control system configured to:
      receive the position and heading information for each of the trolling motors:
      receive a position and an orientation measurement corresponding to the marine vessel, and
      generate control signals for the first, second, and third motors based on the received position and orientation measurements of the marine vessel and the position and heading information for each of the trolling motors.

13. The system of claim 12, wherein the control system is configured to generate the control signals by comparing the position measurement of the marine vessel with a target position.

14. The system of claim 12, wherein the control signal is configured to generate the control signals by comparing the orientation measurement with a target orientation.

15. The system of claim 12, further including a fourth location determining component operable to determine the position of the marine vessel.

16. The system of claim 15, further including a magnetometer operable to determine the orientation of the marine vessel.

\* \* \* \* \*